United States Patent
Ahuja et al.

(10) Patent No.: US 8,918,359 B2
(45) Date of Patent: *Dec. 23, 2014

(54) SYSTEM AND METHOD FOR DATA MINING AND SECURITY POLICY MANAGEMENT

(71) Applicant: McAfee, Inc., Santa Clara, CA (US)

(72) Inventors: Ratinder Ahuja, Saratoga, CA (US); Faizel Lakhani, Campbell, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,210

(22) Filed: May 16, 2013

(65) Prior Publication Data
US 2013/0254838 A1    Sep. 26, 2013

Related U.S. Application Data

(63) Continuation of application No. 12/410,875, filed on Mar. 25, 2009, now Pat. No. 8,447,722.

(51) Int. Cl.
*G06F 17/30* (2006.01)
*G06F 21/60* (2013.01)

(52) U.S. Cl.
CPC ........ *G06F 21/606* (2013.01); *G06F 17/30592* (2013.01)
USPC ...................................................... 707/607

(58) Field of Classification Search
CPC .. H04L 41/28; G06F 17/30539; G06F 21/564
USPC ........................................................ 707/607
See application file for complete search history.

(56) References Cited

U.S. PATENT DOCUMENTS

| 4,286,255 A | 8/1981 | Siy |
| 4,710,957 A | 12/1987 | Bocci et al. |

(Continued)

FOREIGN PATENT DOCUMENTS

| EP | 2499806 | 9/2012 | |
| WO | WO 01/99373 A2 * | 12/2001 | .............. H04L 29/00 |
| WO | WO 2004/008310 | 1/2004 | |
| WO | WO 2012/060892 | 5/2012 | |

OTHER PUBLICATIONS

International Preliminary Report on Patentability Written Opinion of the International Searching Authority for International Application No. PCT/US2011/024902 dated May 7, 2013 (5 pages).

(Continued)

*Primary Examiner* — Albert Phillips, III
(74) *Attorney, Agent, or Firm* — Patent Capital Group

(57) ABSTRACT

A method is provided in one example and includes generating a query for a database for information stored in the database. The information relates to data discovered through a capture system. The method further includes generating an Online Analytical Processing (OLAP) element to represent information received from the query. A rule based on the OLAP element is generated and the rule affects data management for one or more documents that satisfy the rule. In more specific embodiments, the method further includes generating a capture rule that defines items the capture system should capture. The method also includes generating a discovery rule that defines objects the capture system should register. In still other embodiments, the method includes developing a policy based on the rule, where the policy identifies how one or more documents are permitted to traverse a network.

20 Claims, 15 Drawing Sheets

(56) References Cited

U.S. PATENT DOCUMENTS

| | | |
|---|---|---|
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,924,096 A | 7/1999 | Draper et al. |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagilhara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bhrat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,062,705 B1 | 6/2006 | Kirkwood et al. |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,103,607 B1 | 9/2006 | Kirkwood et al. |
| 7,130,587 B2 | 10/2006 | Hikokubo |
| 7,133,400 B1 | 11/2006 | Henderson et al. |
| 7,139,973 B1 | 11/2006 | Kirkwood et al. |
| 7,143,109 B2 | 11/2006 | Nagral et al. |
| 7,158,983 B2 | 1/2007 | Willse et al. |
| 7,181,769 B1 | 2/2007 | Keanini et al. |
| 7,185,073 B1 | 2/2007 | Gai et al. |
| 7,185,192 B1 | 2/2007 | Kahn |
| 7,194,483 B1 | 3/2007 | Mohan et al. |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 | 11/2007 | Chaudhuri et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,299,489 B1 | 11/2007 | Branigan et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,657,104 B2 | 2/2010 | Deninger et al. |
| 7,664,083 B1 | 2/2010 | Cermak et al. |
| 7,685,254 B2 | 3/2010 | Pandya |
| 7,689,614 B2 | 3/2010 | de la Iglesia et al. |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,801,852 B2 * | 9/2010 | Wong et al. .................. 707/615 |
| 7,814,327 B2 | 10/2010 | Ahuja et al. |
| 7,818,326 B2 | 10/2010 | Deninger et al. |
| 7,844,582 B1 | 11/2010 | Arbilla et al. |
| 7,849,065 B2 | 12/2010 | Kamani et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,926,099 B1 | 4/2011 | Chakravarty et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,979,524 B2 | 7/2011 | Dieberger et al. |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |

(56) References Cited

U.S. PATENT DOCUMENTS

| | | |
|---|---|---|
| 8,055,601 B2 | 11/2011 | Pandya |
| 8,056,130 B1 | 11/2011 | Njemanze et al. |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu et al. |
| 8,205,244 B2 | 6/2012 | Nightingale et al. |
| 8,261,347 B2 | 9/2012 | Hrabik et al. |
| 8,271,794 B2 | 9/2012 | Lowe et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 8,463,800 B2 | 6/2013 | Deninger et al. |
| 8,473,442 B1 | 6/2013 | Deninger et al. |
| 8,504,537 B2 | 8/2013 | de la Iglesia et al. |
| 8,560,534 B2 | 10/2013 | Lowe et al. |
| 8,601,537 B2 | 12/2013 | Lu et al. |
| 8,635,706 B2 | 1/2014 | Liu |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0046221 A1 | 4/2002 | Wallace et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0055962 A1 | 3/2003 | Freund et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105716 A1 | 6/2003 | Sutton et al. |
| 2003/0105739 A1 | 6/2003 | Essafi et al. |
| 2003/0105854 A1 | 6/2003 | Thorsteinsson et al. |
| 2003/0131116 A1 | 7/2003 | Jain et al. |
| 2003/0135612 A1 | 7/2003 | Huntington |
| 2003/0167392 A1 | 9/2003 | Fransdonk |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0010484 A1 | 1/2004 | Foulger et al. |
| 2004/0015579 A1 | 1/2004 | Cooper et al. |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0071164 A1 | 4/2004 | Baum |
| 2004/0111406 A1 | 6/2004 | Udeshi et al. |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0122936 A1 | 6/2004 | Mizelle et al. |
| 2004/0139120 A1 | 7/2004 | Clark et al. |
| 2004/0181513 A1 | 9/2004 | Henderson et al. |
| 2004/0181690 A1 | 9/2004 | Rothermel et al. |
| 2004/0193594 A1 | 9/2004 | Moore et al. |
| 2004/0194141 A1 | 9/2004 | Sanders |
| 2004/0196970 A1 | 10/2004 | Cole |
| 2004/0205457 A1 | 10/2004 | Bent et al. |
| 2004/0215612 A1 | 10/2004 | Brody |
| 2004/0220944 A1 | 11/2004 | Behrens et al. |
| 2004/0230572 A1 | 11/2004 | Omoigui |
| 2004/0249781 A1 | 12/2004 | Anderson |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050028 A1 | 3/2005 | Rose et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | Iglesia et al. |
| 2005/0132046 A1 | 6/2005 | de la Iglesia et al. |
| 2005/0132079 A1 | 6/2005 | Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0273614 A1 | 12/2005 | Ahuja et al. |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |

(56) References Cited

U.S. PATENT DOCUMENTS

| | | |
|---|---|---|
| 2006/0242126 A1 | 10/2006 | Fitzhugh |
| 2006/0242313 A1 | 10/2006 | Le et al. |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0039049 A1 | 2/2007 | Kupferman et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0081471 A1 | 4/2007 | Talley et al. |
| 2007/0094394 A1 | 4/2007 | Singh et al. |
| 2007/0106660 A1 | 5/2007 | Stern et al. |
| 2007/0106685 A1 | 5/2007 | Houh et al. |
| 2007/0106693 A1 | 5/2007 | Houh et al. |
| 2007/0110089 A1 | 5/2007 | Essafi et al. |
| 2007/0112837 A1 | 5/2007 | Houh et al. |
| 2007/0112838 A1 | 5/2007 | Bjarnestam et al. |
| 2007/0116366 A1 | 5/2007 | Deninger et al. |
| 2007/0124384 A1 | 5/2007 | Howell et al. |
| 2007/0136599 A1 | 6/2007 | Suga |
| 2007/0139723 A1 | 6/2007 | Beadle et al. |
| 2007/0140128 A1 | 6/2007 | Klinker et al. |
| 2007/0143559 A1 | 6/2007 | Yagawa |
| 2007/0162609 A1 | 7/2007 | Pope et al. |
| 2007/0220607 A1 | 9/2007 | Sprosts et al. |
| 2007/0226504 A1 | 9/2007 | de la Iglesia et al. |
| 2007/0226510 A1 | 9/2007 | Iglesia et al. |
| 2007/0248029 A1 | 10/2007 | Merkey et al. |
| 2007/0260643 A1 | 11/2007 | Borden et al. |
| 2007/0271254 A1 | 11/2007 | Iglesia et al. |
| 2007/0271371 A1 | 11/2007 | Ahuja et al. |
| 2007/0271372 A1 | 11/2007 | Deninger et al. |
| 2007/0280123 A1 | 12/2007 | Atkins et al. |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0127346 A1* | 5/2008 | Oh et al. .......................... 726/23 |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1 | 9/2008 | Balasubramanian et al. |
| 2008/0263019 A1 | 10/2008 | Harrison et al. |
| 2008/0270462 A1 | 10/2008 | Thomsen |
| 2008/0276295 A1 | 11/2008 | Nair |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0178110 A1 | 7/2009 | Higuchi |
| 2009/0187568 A1 | 7/2009 | Morin |
| 2009/0216752 A1 | 8/2009 | Terui et al. |
| 2009/0222442 A1 | 9/2009 | Houh et al. |
| 2009/0232391 A1 | 9/2009 | Deninger et al. |
| 2009/0235150 A1 | 9/2009 | Berry |
| 2009/0254532 A1 | 10/2009 | Yang et al. |
| 2009/0288164 A1 | 11/2009 | Adelstein et al. |
| 2009/0300709 A1 | 12/2009 | Chen et al. |
| 2009/0326925 A1 | 12/2009 | Crider et al. |
| 2010/0011016 A1 | 1/2010 | Greene |
| 2010/0011410 A1 | 1/2010 | Liu |
| 2010/0037324 A1 | 2/2010 | Grant et al. |
| 2010/0088317 A1 | 4/2010 | Bone et al. |
| 2010/0100551 A1 | 4/2010 | Knauft et al. |
| 2010/0121853 A1 | 5/2010 | Iglesia et al. |
| 2010/0174528 A1 | 7/2010 | Oya et al. |
| 2010/0185622 A1 | 7/2010 | Deninger et al. |
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0131199 A1 | 6/2011 | Simon et al. |
| 2011/0149959 A1 | 6/2011 | Liu et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |
| 2012/0180137 A1 | 7/2012 | Liu |
| 2012/0191722 A1 | 7/2012 | Deninger et al. |

OTHER PUBLICATIONS

U.S. Appl. No. 14/042,202, filed Sep. 30, 2013, entitled "Document De-Registration", Inventors(s) Ratinder Paul Singh Ahuja, et al., 60 pages.

Microsoft Outlook, Out look, copyright 1995-2000, 2 pages.

Preneel, Bart, "Cryptographic Hash Functions", Proceedings of the $3^{rd}$ Symposium on State and Progress of Research in Cryptography, 1993, pp. 161-171.

U.S. Appl. No. 11/254,436, filed Oct. 19, 2005, entitled "Attributes of Captured Objects in a Capture System," Inventor(s) William Deninger et al.

U.S. Appl. No. 11/900,964, filed Sep. 14, 2007, entitled "System and Method for Indexing a Capture System," Inventor(s) Ashok Doddapaneni et al.

U.S. Appl. No. 12/190,536, filed Aug. 12, 2008, entitled "Configuration Management for a Capture/Registration System," Inventor(s) Jitendra B. Gaitonde et al.

U.S. Appl. No. 12/352,720, filed Jan. 13, 2009, entitled "System and Method for Concept Building," Inventor(s) Ratinder Paul Singh Ahuja et al.

U.S. Appl. No. 12/354,688, filed Jan. 15, 2009, entitled "System and Method for Intelligent Term Grouping," Inventor(s) Ratinder Paul Ahuja et al.

U.S. Appl. No. 12/358,399, filed Jan. 23, 2009, entitled "System and Method for Intelligent State Management," Inventor(s) William Deninger et al.

U.S. Appl. No. 12/360,537, filed Jan. 27, 2009, entitled "Database for a Capture System," Inventor(s) Rick Lowe et al.

U.S. Appl. No. 12/410,875, filed Mar. 25, 2009, entitled "System and Method for Data Mining and Security Policy Management," Inventor(s) Ratinder Paul Singh Ahuja et al.

U.S. Appl. No. 12/410,905, filed Mar. 25, 2009, entitled "System and Method for Managing Data and Policies," Inventor(s) Ratinder Paul Singh Ahuja et al.

U.S. Appl. No. 12/690,153, filed Jan. 20, 2010, entitled "Query Generation for a Capture System," Inventor(s) Erik de la Iglesia, et al.

U.S. Appl. No. 12/751,876, filed Mar. 31, 2010, entitled "Attributes of Captured Objects in a Capture System," Inventor(s) William Deninger, et al.

U.S. Appl. No. 12/829,220, filed Jul. 1, 2010, entitled "Verifying Captured Objects Before Presentation," Inventor(s) Rick Lowe, et al.

U.S. Appl. No. 12/873,061, filed Aug. 31, 2010, entitled "Document Registration," Inventor(s) Ratinder Paul Singh Ahuja, et al.

U.S. Appl. No. 12/873,860, filed Sep. 1, 2010, entitled "A System and Method for Word Indexing in a Capture System and Querying Thereof," Inventor(s) William Deninger, et al.

U.S. Appl. No. 12/939,340, filed Nov. 3, 2010, entitled "System and Method for Protecting Specified Data Combinations," Inventor(s) Ratinder Paul Singh Ahuja, et al.

(56) References Cited

OTHER PUBLICATIONS

U.S. Appl. No. 12/967,013, filed Dec. 13, 2010, entitled "Tag Data Structure for Maintaining Relational Data Over Captured Objects," Inventor(s) Erik de la Iglesia, et al.
Han, OLAP Mining: An Integration of OLAP with Data Mining, Oct. 1997, pp. 1-18.
Niemi, Constructing OLAP Cubes Based on Queries, Nov. 2001, pp. 1-7.
Schultz, Data Mining for Detection of New Malicious Executables, May 2001, pp. 1-13.
U.S. Appl. No. 13/024,923, filed Feb. 10, 2011, entitled "High Speed Packet Capture," Inventor(s) Weimin Liu, et al.
U.S. Appl. No. 13/047,068, filed Mar. 14, 2011, entitled "Cryptographic Policy Enforcement," inventor(s) Ratinder Paul Singh Ahuja, et al.
U.S. Appl. No. 13/049,533, filed Mar. 16, 2011, entitled "File System for a Capture System," Inventor(s) Rick Lowe, et al.
U.S. Appl. No. 13/089,158, filed Apr. 18, 2011, entitled "Attributes of Captured Objects in a Capture System," Inventor(s) Ratinder Paul Singh Ahuja, et al.
U.S. Appl. No. 13/099,516, filed May 3, 2011, entitled "Object Classification in a Capture System," Inventor(s) William Deninger, et al.
Mao et al, "MOT: Memory Online Tracing of Web Information System," Proceedings of the Second international Conference on Web information Systems Engineering (WISE '01); pp. 271-277, (IEEE0-0-7695-1393-X/02) Aug. 7, 2002 (7 pages).
International Search Report and Written Opinion and Declaration of Non-Establishment of international Search Report for International Application No. PCT/US2011/024902 mailed Aug. 1, 2011 (8 pages).
U.S. Appl. No. 13/168,739, filed Jun. 24, 2011, entitled "Method and Apparatus for Data Capture and Analysis System," Inventor(s) Erik de la Iglesia et al.
U.S. Appl. No. 13/187,421, filed Jul. 20, 2011, entitled "Query Generation fora Capture System," Inventor(s) Erik de la Iglesia, et al.
U.S. Appl. No. 13/188,441, filed Jul. 21, 2011, entitled "Locational Tagging in a Capture System," Inventor(s) William Deninger et al.
Webopedia, definition of "filter", 2002, p. 1.
Werth, T. et al,, "Chapter 1—DAG Mining in Procedural Abstraction," Programming Systems Group; Computer Science Department, University of Erlangen-Nuremberg, Germany, (15 pages).
Office Action from U.S. Appl. No. 10/815,239, mailed Feb. 8, 2008 (8 pages).
Office Action from U.S. Appl. No. 10/815,239, mailed Jun. 13, 2007 (8 pages).
Office Action from U.S. Appl. No. 11/388,734, mailed Feb. 5, 2008, 12 pages.
Office Action from U.S. Appl. No. 10/854,005, mailed Feb. 16, 2011 (13 pages).
Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.
U.S. Appl. No. 13/422,791, filed Mar. 16, 2012, entitled "System and Method for Data Mining and Security Policy Management", Inventor, Weimin Liu.
U.S. Appl. No. 13/424,249, filed Mar. 19, 2012, entitled "System and Method for Data Mining and Security Policy Management", Inventor, Weimin Liu.
U.S. Appl. No. 13/431,678, filed Mar. 27, 2012, entitled "Attributes of Captured Objects in a Capture System", Inventors William Deninger, et al.
U.S. Appl. No. 13/436,275, filed Mar. 30, 2012, entitled "System and Method for intelligent State Management", Inventors William Deninger, et al.
U.S. Appl. No. 13/337,737, filed Dec. 27, 2011, entitled "System and Method for Providing Data Protection Workflows in a Network Environment", Inventor(s) Ratinder Paul Singh Ahuja, et al.
U.S. Appl. No. 13/338,060, filed Dec. 27, 2011, entitled "System and Method for Providing Data Protection Workflows in a Network Environment", Inventor(s) Ratinder Paul Singh Ahuja, et al.
U.S. Appl. No. 13/338,159, filed Dec. 27, 2011, entitled "System and Method for Providing Data Protection Workflows in a Network Environment", Inventor(s) Ratinder Paul Singh Ahuja, et al.
U.S. Appl. No. 13/338,195, filed Dec. 27, 2011, entitled "System and Method for Providing Data Protection Workflows in a Network Environment", Inventor(s) Ratinder Paul Singh Ahuja, et al.
Walter Allasia et al., Indexing and Retrieval of Multimedia Metadata on a Secure DHT, University of Torino, Italy, Department of Computer Science, Aug. 31, 2008, 16 pages.

* cited by examiner

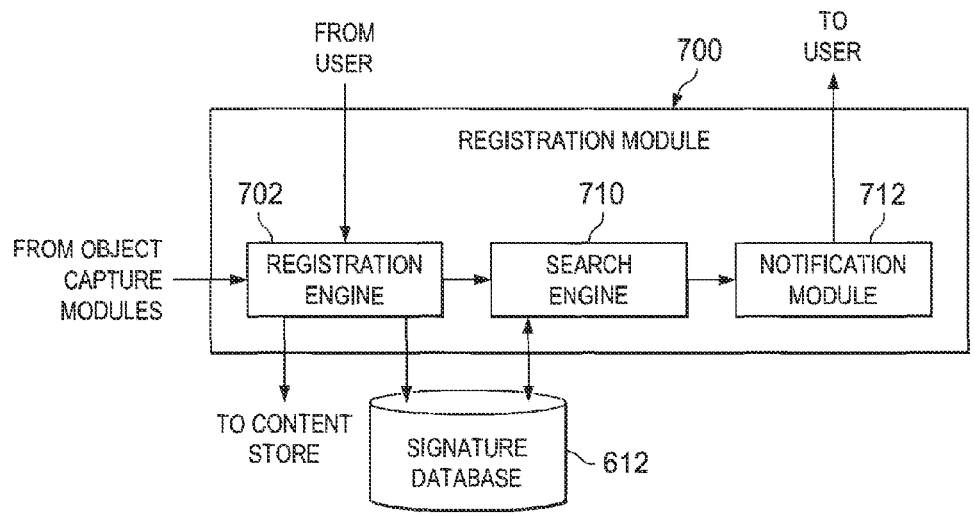
FIG. 7
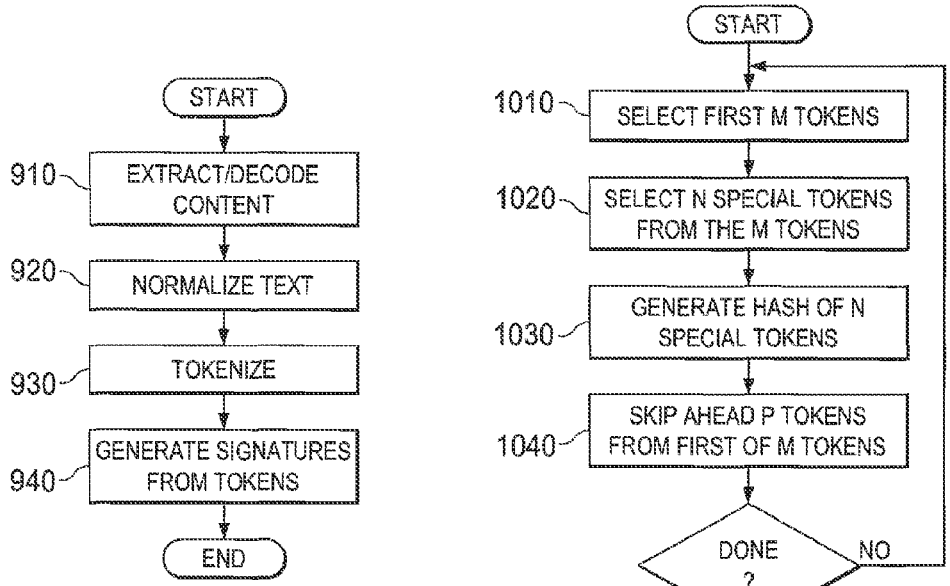
FIG. 9
FIG. 10

SYSTEM AND METHOD FOR DATA MINING AND SECURITY POLICY MANAGEMENT

CROSS-REFERENCE TO RELATED APPLICATION

This Application is a continuation (and claims the benefit of priority under 35 U.S.C. §120) of U.S. patent application Ser. No. 12/410,875, filed Mar. 25, 2009, entitled "SYSTEM AND METHOD FOR DATA MINING AND SECURITY POLICY MANAGEMENT." The disclosure of the prior Application is considered part of and is incorporated by reference in the disclosure of this Application.

TECHNICAL FIELD OF THE INVENTION

The present invention relates to computer networks and, more particularly, to a system and a method for data mining and security policy management.

BACKGROUND OF THE INVENTION

Computer networks have become indispensable took for modern business. Enterprises can use networks for communications and, further, can store data in various forms and at various locations. Critical information frequently propagates over a network of a business enterprise. Modern enterprises employ numerous took to control the dissemination of such information and many of these took attempt to keep outsiders, intruders, and unauthorized personnel from accessing valuable or sensitive information. Commonly, these took can include firewalls, intrusion detection systems, and packet sniffer devices.

The ability to offer a system or a protocol that offers an effective data management system, capable of securing and controlling the movement of important information, provides a significant challenge to security professionals, component manufacturers, service providers, and system administrators alike.

BRIEF DESCRIPTION OF THE DRAWINGS

The present invention is illustrated by way of example, and not by way of limitation, in the FIGURES of the accompanying drawings in which like reference numerals refer to similar elements and in which:

FIG. 7 is a block diagram illustrating a registration module according to one embodiment of the present invention;

FIG. 9 is a flow diagram illustrating an embodiment of a flow to generate signatures;

FIG. 10 is a flow diagram illustrating an embodiment of changing tokens into document signatures;

DETAILED DESCRIPTION OF EXAMPLE EMBODIMENTS

Although the present system will be discussed with reference to various illustrated examples, these examples should not be read to limit the broader spirit and scope of the present invention. Some portions of the detailed description that follows are presented in terms of algorithms and symbolic representations of operations on data within a computer memory. These algorithmic descriptions and representations are the means used by those skilled in the art of computer science to most effectively convey the substance of their work to others skilled in the art. An algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It has proven convenient at times, principally for reasons of common usage, to refer to these signals as bits, values, elements, symbols, characters, terms, numbers, or the like. Keep in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying", etc., refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
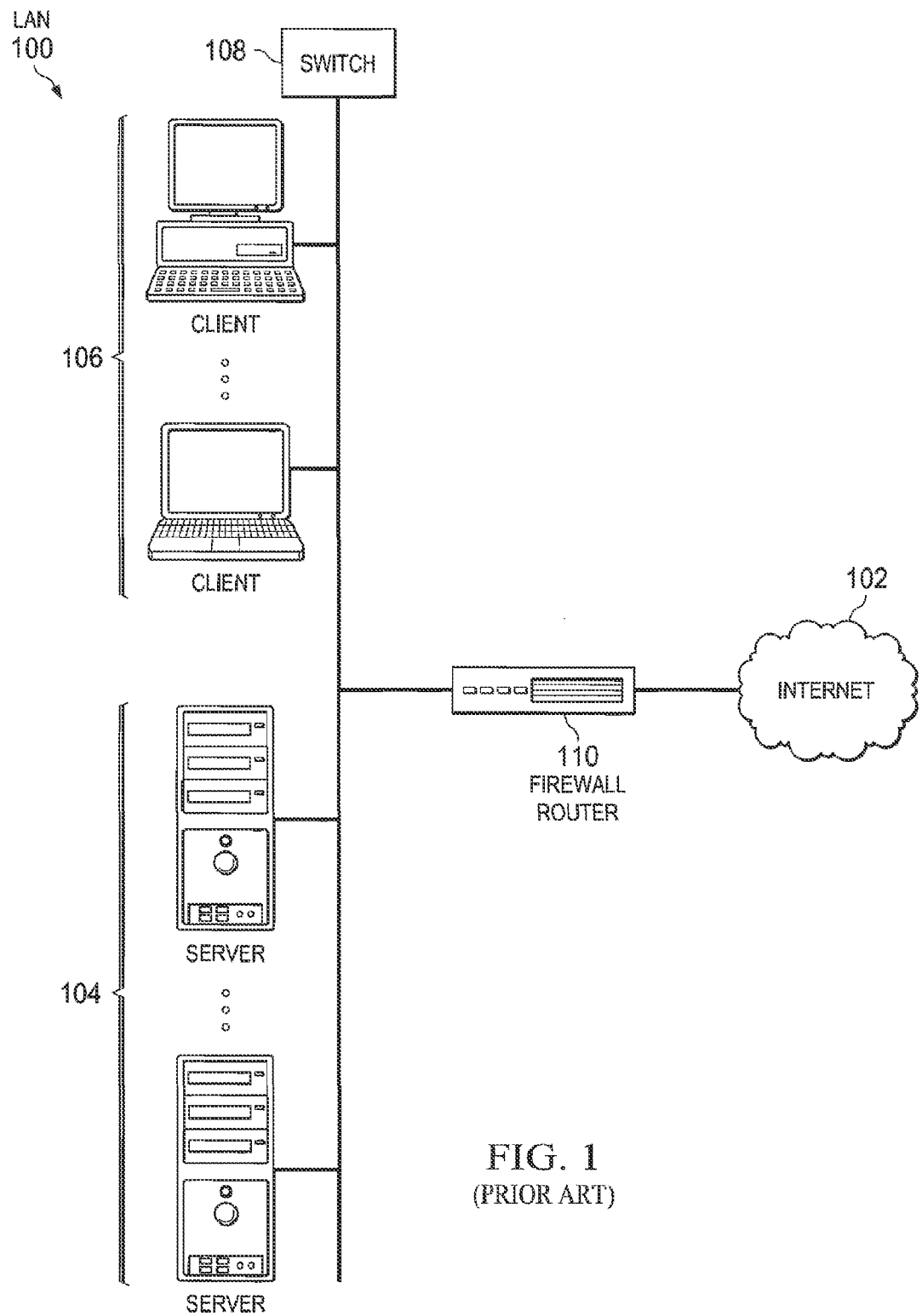
FIG. 1 is a block diagram illustrating a computer network connected to the Internet.

FIG. 1 illustrates a simple prior art configuration of a local area network (LAN) 100 connected to Internet 102. Connected to LAN 100 are various components such as servers 104, clients 106, and switch 108. Numerous other networking components and computing devices may be connected to the LAN 100. LAN 100 may be implemented using various wireline (e.g., Ethernet) or wireless technologies (e.g., IEEE 802.11x). LAN 100 could also be connected to other LANs.

In this prior configuration, LAN 100 is connected to the Internet 102 via a router 110. Router 110 may be used to implement a firewall. Firewalls are used to try to provide users of LANs with secure access to the Internet as well as to provide a separation of a public Web server (e.g., one of servers 104) from an internal network (e.g., LAN 100). Data leaving LAN 100 and going to Internet 102 passes through router 110. Router 120 simply forwards packets as is from LAN 100 to Internet 102. Router 110 routes packets to and from a network and the Internet. While the router may log that a transaction has occurred (i.e., packets have been routed), it does not capture, analyze, or store the content contained in the packets.

Figure 2:
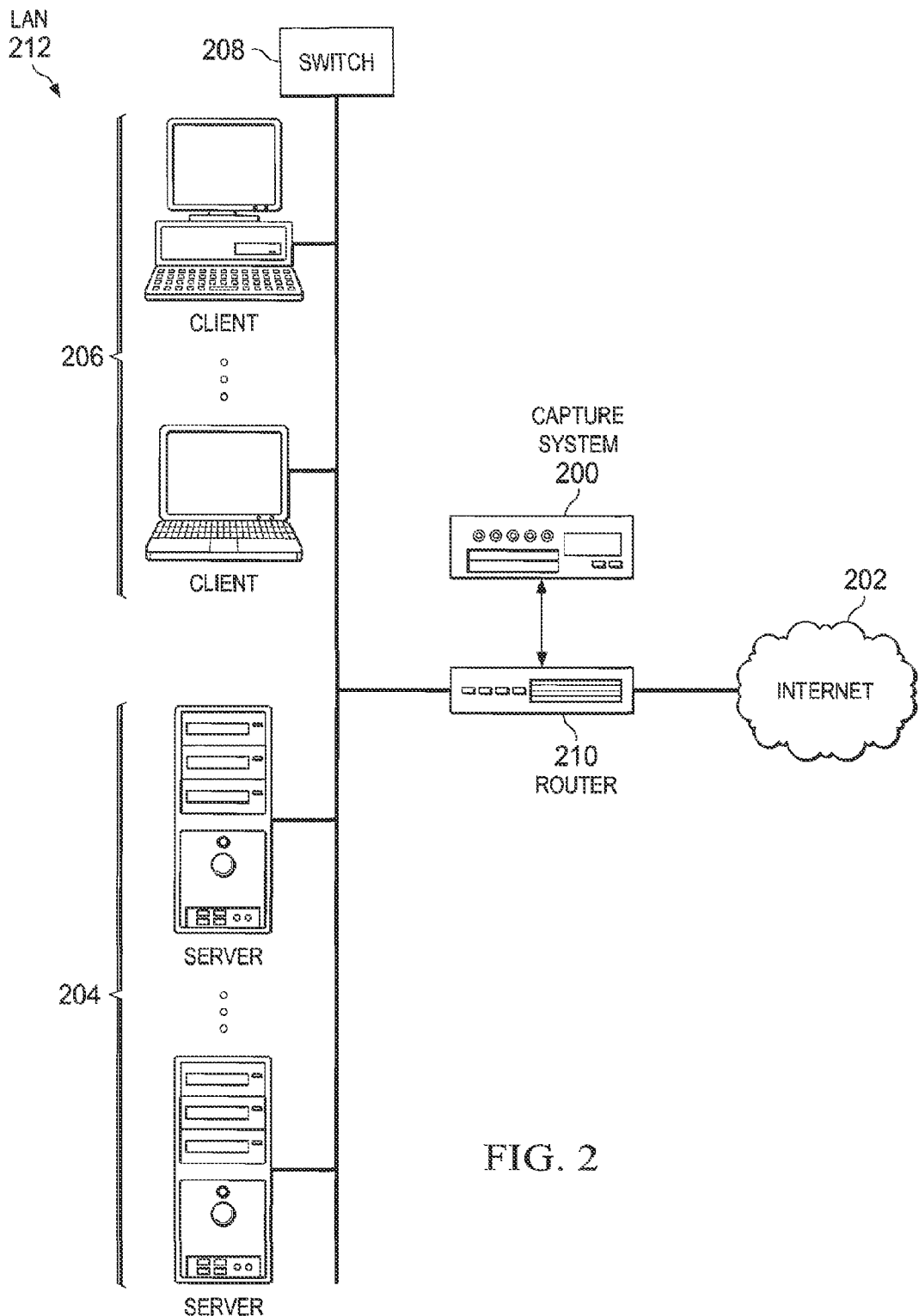
FIG. 2 is a block diagram illustrating one configuration of a capture system according to one embodiment of the present invention.

FIG. 2 is a simplified block diagram of a capture system 200, which includes a LAN 212, a set of clients 206, a set of servers 204, a router 210, and an Internet element 202. Capture system 200 may be configured sequentially in front of, or behind, router 210. In systems where a router is not used, capture system 200 may be located between LAN 212 and Internet 202. Stated in other terms, if a router is not used, capture system 200 can operate to forward packets to Internet 202, in accordance with one example paradigm. In one embodiment, capture system 200 has a user interface accessible from a LAN-attached device such as client(s) 206.

Clients 206 are endpoints or customers wishing to affect or otherwise manage a communication in the proffered architecture. The term 'client' may be inclusive of devices used to initiate a communication, such as a computer, a personal digital assistant (PDA), a laptop or electronic notebook, a cellular telephone, or any other device, component, element, or object capable of initiating voice, audio, or data exchanges within the proffered architecture. The endpoints may also be inclusive of a suitable interface to the human user, such as a microphone, a display, or a keyboard or other terminal equipment. The endpoints may also be any device that seeks to initiate a communication on behalf of another entity or element, such as a program, a database, or any other component, device, element, or object capable of initiating a voice or a data exchange within the proffered architecture. Data, as used herein in this document, refers to any type of numeric, voice, or script data, or any type of source or object code, or any other suitable information in any appropriate format that may be communicated from one point to another.

In operation, capture system 200 intercepts data leaving a network [such as LAN 212]. In an embodiment, the capture system also intercepts data being communicated internally to a network such as LAN 212. Capture system 200 can reconstruct documents leaving the network and store them in a searchable fashion. Capture system 200 is then used to search and sort through all documents that have left the network. There are many reasons why such documents may be of interest, including: network security reasons, intellectual property concerns, corporate governance regulations, and other corporate policy concerns. Example documents include, but are not limited to, Microsoft Office documents (such as Word, Excel, etc.), text files, images (such as JPEG, BMP, GIF, PRIG, etc.), Portable Document Format (PDF) files, archive files (such as GZIP, ZIP, TAR, JAR, WAR, RAR, etc.), email messages, email attachments, audio files, video files, source code files, executable files, etc.

Capture System

Figure 3:
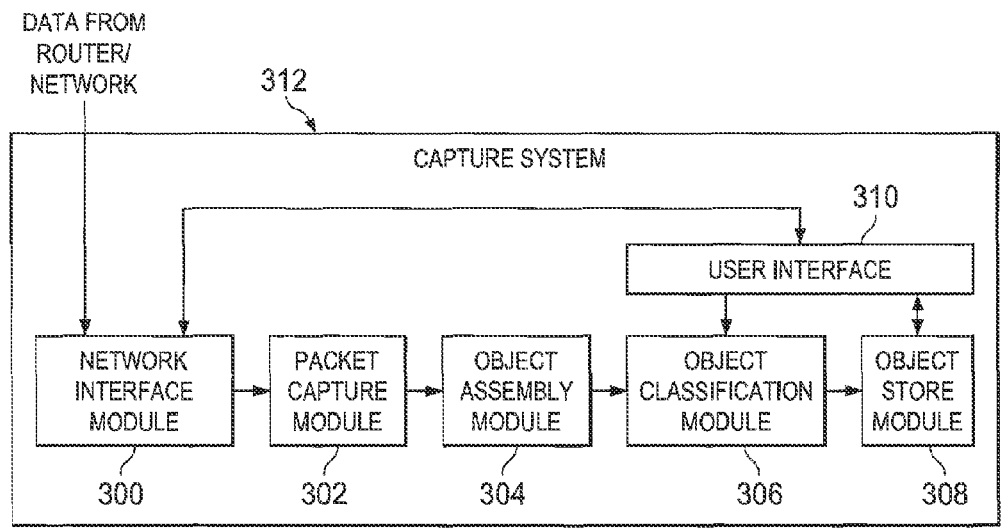
FIG. 3 is a block diagram illustrating the capture system according to one embodiment of the present invention.

FIG. 3 shows an embodiment of a capture system 312 in detail and it includes a network interface module 300, packet capture module 302, an object module 304, an object classification module 306, an object store module 308, and a user interface 310. A capture system (such as capture system 200 or 312) may also be referred to as a content analyzer, content/data analysis system, or other similar name. For simplicity, the capture system has been labeled as capture system 312. However, the discussion regarding capture system 312 is equally applicable to capture system 200. A network interface module 300 receives (captures) data, such as data packets, from a network or router. Example network interface modules 300 include network interface cards (NICs) (for example, Ethernet cards). More than one NIC may be present in a capture system.

This captured data is passed from network interface module 300 to a packet capture module 302, which extracts packets from the captured data. Packet capture module 302 may extract packets from streams with different sources and/or destinations. One such case is asymmetric routing where a packet sent from source "A" to destination "B" travels along a first path and responses sent from destination "B" to source "A" travel along a different path. Accordingly, each path could be a separate "source" for packet capture module 302 to obtain packets. Additionally, packet data may be extracted from a packet by removing the packet's header and checksum.

When an object is transmitted, such as an email attachment, it is broken down into packets according to various data transfer protocols such as Transmission Control Protocol/Internet Protocol ("TCP/IP"), UDP, HTTP, etc. An object assembly module 304 reconstructs the original or a reasonably equivalent document from the captured packets. For example, a PDF document broken down into packets before being transmitted from a network is reassembled to form the original, or reasonable equivalent of the, PDF from the captured packets associated with the PDF document. A complete data stream is obtained by reconstruction of multiple packets. The process by which a packet is created is beyond the scope of this application.

In alternative embodiments, instead of being implemented in conjunction with (or included within) a router, capture system 200 may be included as part of other network appliances such as switches, gateways, bridges, loadbalancers, servers, or any other suitable device, component, element, or object operable to exchange information in a network environment. Moreover, these network appliances and/or capture systems may include any suitable hardware, software, components, modules, interfaces, or objects that facilitate the operations thereof. This may be inclusive of appropriate algorithms and communication protocols that facilitate the data mining and policy management operations detailed herein.

One or more tables may be included in these network appliances (or within capture system 200). In other embodiments, these tables may be provided externally to these elements, or consolidated in any suitable fashion. The tables are memory elements for storing information to be referenced by their corresponding network appliances. As used herein in this document, the term 'table' is inclusive of any suitable database or storage medium (provided in any appropriate format) that is capable of maintaining information pertinent to the operations detailed herein in this Specification. For example, the tables may store information in an electronic register, diagram, record, index, list, or queue. Alternatively, the tables may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Figure 4:
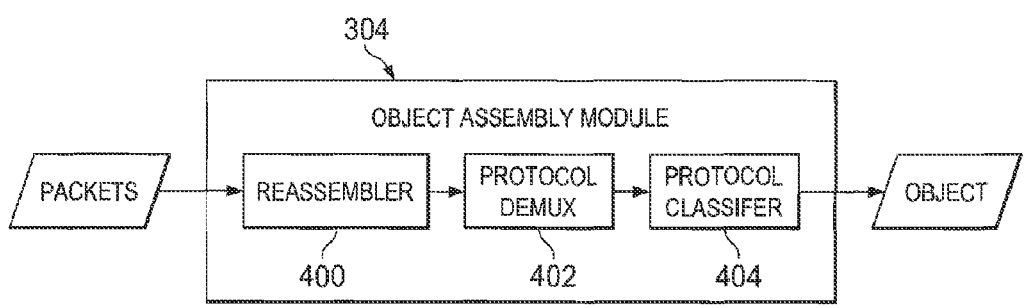
FIG. 4 is a block diagram illustrating an object assembly module according to one embodiment of the present invention.

FIG. 4 illustrates a more detailed embodiment of object assembly module 304 and FIG. 4 is discussed in conjunction with some of the internal components of FIG. 3 for purposes of explanation. This object assembly module includes a re-assembler 400, protocol demultiplexer ("demux") 402, and a protocol classifier 404. Packets entering the object assembly module 304 are provided to re-assembler 400. Re-assembler 400 groups (assembles) the packets into at least one unique flow. A TCP/IP flow contains an ordered sequence of packets that may be assembled into a contiguous data stream by re-assembler 400. An example flow includes packets with an identical source IP and destination IP address and/or identical TCP source and destination ports. In other words, re-assembler 400 assembles a packet stream (flow) by sender and recipient. Thus, a flow is an ordered data stream of a single communication between a source and a destination. In an embodiment, a state machine is maintained for each TCP connection, which ensures that the capture system has a clear picture of content moving across every connection.

Re-assembler 400 begins a new flow upon the observation of a starting packet. This starting packet is normally defined by the data transfer protocol being used. For example, the starting packet of a TCP flow is a "SYN" packet. The flow terminates upon observing a finishing packet (e.g., a "Reset" or "FIN" packet in TCP/IP) or via a timeout mechanism if the finished packing is not observed within a predetermined time constraint.

A flow assembled by re-assembler 400 is provided to a protocol demultiplexer ("demux") 402. Protocol demux 402 sorts assembled flows using ports, such as TCP and/or UDP ports, by performing speculative classification of the flow's contents based on the association of well-known port numbers with specified protocols. For example, because web Hyper Text Transfer Protocol (HTTP) packets, such as, Web traffic packets, are typically associated with TCP port 80, packets that are captured over TCP port 80 are speculatively classified as being HTTP. Examples of other well-known ports include TCP port 20 (File Transfer Protocol ("FTP")), TCP port 88 (Kerberos authentication packets), etc. Thus, protocol demux 402 separates the flows by protocols.

A protocol classifier 404 further sorts flows. Protocol classifier 404 (operating in either parallel or in sequence to protocol demux 402) applies signature filters to a flow to identify the protocol based solely on the transported data. Protocol classifier 404 uses a protocol's signature(s) (i.e., the characteristic data sequences of a defined protocol) to verify the speculative classification performed by protocol demux 402. If protocol classifier 404 determines that the speculative classification is incorrect, it overrides it. For example, if an individual or program attempted to masquerade an illicit communication (such as file sharing) using an apparently benign port (for example, TCP port 80), protocol classifier 404 would use the HTTP protocol signature(s) to verify the speculative classification performed by protocol demux 402.

Protocol classification helps identify suspicious activity over non-standard ports. A protocol state machine is used to determine which protocol is being used in a particular network activity. This determination is made independent of the port or channel on which the protocol is active. As a result, the capture system recognizes a wide range of protocols and applications, including SMTP, FTP, HTTP, P2P, and proprietary protocols in client-server applications. Because protocol classification is performed independent of which port number was used during transmission, the capture system monitors and controls traffic that may be operating over non-standard ports. Non-standard communications may indicate that an enterprise is at risk from spyware, adware, or other malicious code, or that some type of network abuse or insider threat may be occurring.

Object assembly module 304 outputs each flow, organized by protocol, representing the underlying objects being transmitted. These objects are passed to object classification module 306 (also referred to as the "content classifier") for classification based on content. A classified flow may still contain multiple content objects depending on the protocol used. For example, a single flow using HTTP may contain over 100 objects of any number of content types. To deconstruct the flow, each object contained in the flow is individually extracted and decoded, if necessary, by object classification module 306.

Object classification module 306 uses the inherent properties and/or signature(s) of various documents to determine the content type of each object. For example, a Word document has a signature that is distinct from a PowerPoint document or an email. Object classification module 306 extracts each object and sorts them according to content type. This classification prevents the transfer of a document whose file extension or other property has been altered. For example, a Word document may have its extension changed from .doc to .dock but the properties and/or signatures of that Word document remain the same and detectable by object classification module 306. In other words, object classification module 306 functions beyond simple extension filtering.

According to an embodiment, a capture system uses one or more of six mechanisms for classification: 1) content signature; 2) grammar analysis; 3) statistical analysis; 4) file classification; 5) document biometrics; and 6) concept maps. Content signatures are used to look for predefined byte strings or text and number patterns (i.e., Social Security numbers, medical records, and bank accounts). When a signature is recognized, it becomes part of the classification vector for that content. While beneficial when used in combination with other metrics, signature matching alone may lead to a high number of false positives.

Grammar analysis determines if an object's content is in a specific language and filters accordingly based on this information, Various types of content have their own grammar or syntax. For example, "C" source code uses "if/then" grammar. Legal documents, resumes, and earnings results all have a particular grammar. Grammar analysis also enables an organization to detect the presence of non-English language-based content on their network.

File classification identifies content types regardless of the extensions applied to the file or compression. The file classification mechanism looks for specific file markers instead of relying on normal telltale signs such as .xls or .pdf. Document biometrics identifies sensitive data even if the data has been modified, Document biometrics recognizes content rich elements in files regardless of the order or combination in which they appear. For example, a sensitive Word document may be identified even if text elements inside the document or the file name itself have been changed. Excerpts of larger files, e.g., a single column exported from an Excel spreadsheet containing Social Security numbers, may also be identified. Document biometrics takes "snapshots" of protected documents in order to build a signature set for protecting them, In an embodiment, document biometrics distinguishes between public and confidential information within the same document.

Statistical analysis assigns weights to the results of signature, grammar, and biometric analysis. That is, the capture system tracks how many times there was a signature, grammar, or biometric match in a particular document or file. This phase of analysis contributes to the system's overall accuracy.

Concept maps may be used to define and track complex or unique content, whether at rest, in motion, or captured. Concept maps are based on combinations of data classification mechanisms and provide a way to protect content using compound policies. Object classification module 306 may also determine whether each object should be stored or discarded. This determination is based on definable capture rules used by object classification module 306. For example, a capture rule may indicate that all Web traffic is to be discarded. Another capture rule may indicate that all PowerPoint documents should be stored except for ones originating from the CEO's IP address. Such capture rules are implemented as regular expressions or by other similar means.

Capture rules may be authored by users of a capture system and, further, may include virtually any item (in addition to those items discussed herein). The capture system may also be made accessible to any network-connected machine through network interface module 300 and/or user interface 310. In one embodiment, user interface 310 is a graphical user interface providing the user with easy access to the various features of capture system 312. For example, user interface 310 may provide a capture rule-authoring tool that allows any capture rule desired to be written. These rules are then applied by object classification module 306 when determining whether an object should be stored. User interface 310 may also provide pre-configured capture rules that the user selects from along with an explanation of the operation of such standard included capture rules. Generally, by default, the capture rule(s) implemented by object classification module 306 captures all objects leaving the network that the capture system can access. If the capture of an object is mandated by one or more capture rules, object classification module 306 may determine where in object store module 308 the captured object should be stored.

Figure 5:
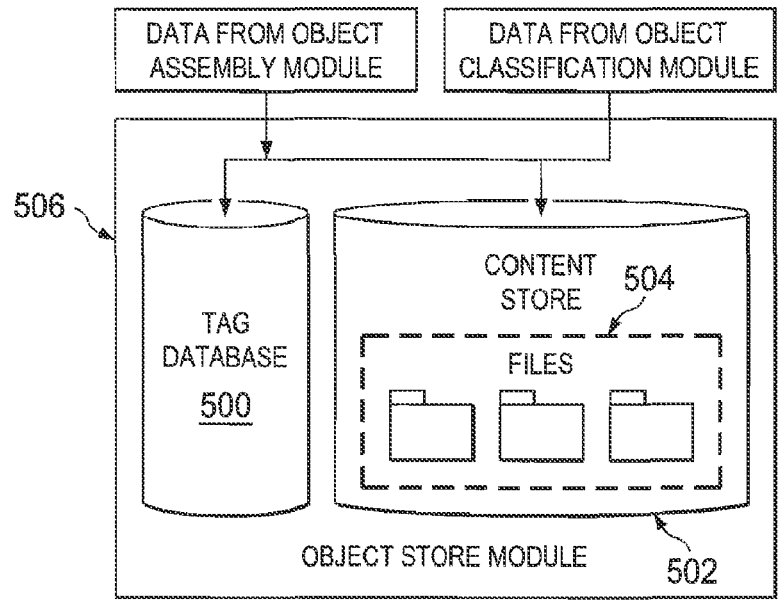
FIG. 5 is a block diagram illustrating an object store module according to one embodiment of the present invention.

FIG. 5 illustrates an embodiment of object store module 308. According to this embodiment, the object store includes a tag database 500 and a content store 502. Within content store 502 are files 504 grouped by content type. For example, if object classification module 306 determines that an object is a Word document that should be stored it can store it in file 504 reserved for Word documents. Object store module 506 may be internal to a capture system or external (entirely or in part) using, for example, some network storage technique such as network attached storage (NAS), storage area network (SAN), or other database.

In regards to the tag data structure, in an embodiment, content store 502 is a canonical storage location that is simply a place to deposit the captured objects. The indexing of the objects stored in content store 502 is accomplished using tag database 500. Tag database 500 is a database data structure in which each record is a "tag" that indexes an object in content store 502 and contains relevant information about the stored object. An example of a tag record in tag database 500 that indexes an object stored in content store 502 is set forth in Table 1:

TABLE 1

| Field Name | Definition (Relevant Information) |
| --- | --- |
| MAC Address | NIC MAC address |
| Source IP | Source IP address of object |
| Destination IP | Destination IP address of object |
| Source Port | Source port number of object |
| Destination Port | Destination port number of the object |

TABLE 1-continued

| Field Name | Definition (Relevant Information) |
| --- | --- |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |
| Attribute | One or more attributes related to the object |

There are various other possible tag fields and some tag fields listed in Table 1 may not be used. In an embodiment, tag database 500 is not implemented as a database and another data structure is used. The mapping of tags to objects may be obtained by using unique combinations of tag fields to construct an object's name. For example, one such possible combination is an ordered list of the source IP, destination IP, source port, destination port, instance, and timestamp. Many other such combinations, including both shorter and longer names, are possible. A tag may contain a pointer to the storage location where the indexed object is stored. The tag fields shown in Table 1 can be expressed more generally, to emphasize the underlying information indicated by the tag fields in various embodiments. Some of the possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |
| Attribute | One or more attributes related to the object |

For many of the above tag fields in Tables 1 and 2, the definition adequately describes the relational data contained by each field. For the content field, the types of content that the object can be labeled as are numerous. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, F renchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of capture system 200. Only capture system 200 knows its own private key, thus, the integrity of the stored object can be verified by comparing a hash of the stored object to the signature decrypted with the public key of capture system 200, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

When a user searches over the objects captured by capture system 200, it is desirable to make the search as fast as possible. One way to speed up searches is to perform searches over the tag database instead of the content store, since the content store will generally be stored on disk and is far more costly in terms of both time and processing power to search then a database.

The objects and tags stored in object store module 308 may be interactively queried by a user via user interface 310. In one embodiment, the user interface interacts with a web server (not shown) to provide the user with Web-based access to capture system 312. The objects in the object store module 308 are searchable for specific textual or graphical content using exact matches, patterns, keywords, and/or various other attributes. For example, user interface 310 may provide a query-authoring tool (not shown) to enable users to create complex searches of object store module 308. These search queries are provided to a data-mining engine (not shown) that parses the queries to the object store module. For example, tag database 500 may be scanned and the associated object retrieved from content store 502. Objects that matched the specific search criteria in the user-authored query are counted and/or displayed to the user (e.g., by user interface 310).

Searches may be scheduled to occur at specific times or at regular intervals. User interface 310 may provide access to a scheduler (not shown) that periodically executes specific queries. Reports containing the results of these searches are made available to the user at runtime or later such as generating an alarm in the form of an e-mail message, page, system log, and/or other notification format.

A user query for a pattern is generally in the form of a regular expression. A regular expression is a string that describes or matches a set of strings, according to certain syntax rules. There are various well-known syntax rules such as the POSIX standard regular expressions and the PERL scripting language regular expressions. Regular expressions are used by many text editors and utilities to search and manipulate bodies of text based on certain patterns. Regular expressions are well known in the art. For example, according to one syntax (UNIX), the regular expression 4\d{15} means the digit "4" followed by any fifteen digits in a row. This user query would return all objects containing such a pattern.

Certain useful search categories cannot be defined well by a single regular expression. As an example, a user may want to query all emails containing a credit card number. Various credit card companies used different numbering patterns and conventions. A card number for each company can be represented by a regular expression. However, the concept of credit card number can be represented by a union of all such regular expressions. For such categories, the concept of attribute is herein defined. An attribute, in one embodiment, represents a group of one or more regular expressions (or other such patterns). The term "attribute" is merely descriptive, such concept could just as easily be termed "category," "regular expression list," or any other descriptive term.

Generally, a capture system has been described above as a stand-alone device. However, capture systems may be implemented on any appliance capable of capturing and analyzing data from a network. For example, capture system 312 described above could be implemented on one or more of the servers or clients shown in FIG. 1. Additionally, a capture system may interface with a network in any number of ways including, but not limited to, wirelessly.

In one embodiment, the attributes are completely user-configurable. A user interface provides an attribute editor that allows a user to define attributes by creating an attribute and associating a group of one or more regular expressions with the created attribute. The capture device may come preconfigured with a list of common or popular attributes that may be tailored specifically to the industry into which the capture device is sold.

In one embodiment, a capture device may create new attributes automatically. For example, a capture device may observe that a certain regular expression is being searched with some threshold frequency (generally set to be above normal). The capture device creates an attribute to be associated with this regular expression and begins tagging the newly defined attribute when capturing new objects. In another embodiment, a capture device may suggest that a new attribute be created when a regular expression is searched frequently. In yet another embodiment, a capture device may suggest that an attribute be deleted if infrequently used to make room for another more useful attribute. In terms of the query generation, example embodiments of the present invention allow objects and/or their associated metadata to be searchable upon request. For example, emails, documents, images, etc. may be processed by a capture system and searched.

Document Registration

The capture system described above implements a document registration scheme. A user registers a document with a capture system, the system then alerts the user if all, or part, of the content in the registered document is attempting to, or leaving, the network. Thus, unauthorized documents of various formats (e.g., Microsoft Word, Excel, PowerPoint, source code of any kind, and text are prevented) are prevented from leaving an enterprise. There are great benefits to any enterprise that keeps its intellectual property, and other critical, confidential, or otherwise private and proprietary content from being mishandled. Sensitive documents are typically registered with the capture system 200, although registration may be implemented using a separate device.

Figure 6:
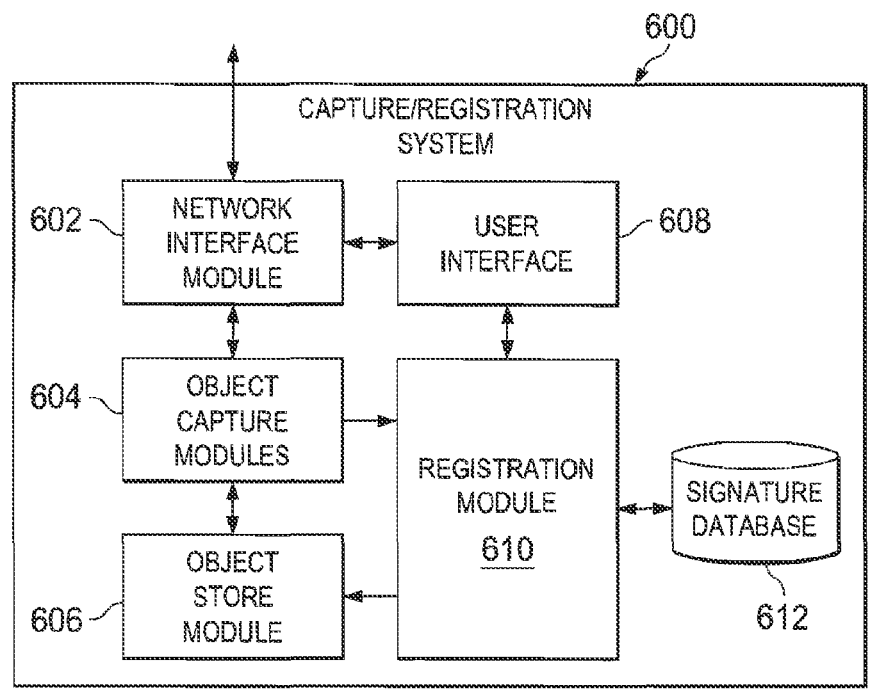
FIG. 6 is a block diagram illustrating a document registration system according to one embodiment of the present invention.

FIG. 6 illustrates an embodiment of a capture/registration system. Capture/registration system 600 has components that are used in a similar or identical way to those of capture system 312 shown in FIG. 3, including network interface module 602, object store module 606, user interface 608, and object capture modules 604, and a signature database 612. Capture/registration system 600 includes a registration module 610 interacting with a signature storage (such as database 612) to help facilitate a registration scheme. There are numerous ways to register documents. For example, a document may be electronically mailed (e-mailed), uploaded to registration system 600 (for example through the network interface module 702 or through removable media), registration system 600 scanning a file server (registration server) for documents to be registered, etc. The registration process may be integrated with an enterprise's document management systems. Document registration may also be automated and transparent based on registration rules, such as "register all documents," "register all documents by specific author or IP address," etc.

After being received, classified, etc., a document to be registered is passed to registration module 610. Registration module 610 calculates a signature or a set of signatures of the document. A signature associated with a document may be calculated in various ways. An example signature consists of hashes over various portions of the document, such as selected or all pages, paragraphs, tables and sentences. Other possible signatures include, but are not limited to, hashes over embedded content, indices, headers, footers, formatting information, or font utilization. A signature may also include computations and meta-data other than hashes, such as word Relative Frequency Methods (RFM)—Statistical, Karp-Rabin Greedy-String-Tiling-Transposition, vector space models, diagrammatic structure analysis, etc.

The signature or set of signatures associated on a document is stored in signature database 612. The signature storage may be implemented as a database or other appropriate data structure as described earlier. In an embodiment, signature storage 608 is external to capture system 600. Registered documents are stored as objects in object store module 606 according to the rules set for the system. In an embodiment, only documents are stored in object store module 606 of the object system network. These documents have no associated tag since many tag fields do not apply to registered documents.

As set forth above, object capture modules 604 extract objects leaving the network and store various objects based on capture rules. In an embodiment, all extracted objects (whether subject to a capture rule or not) are also passed to the registration module for a determination whether each object is, or includes part of, a registered document. Registration module 610 calculates the set of one or more signatures of an object received from object capture modules 604 in the same manner as the calculation of the set of one or more signatures of a document received from user interface 602 to be registered. This set of signatures is then compared against all signatures in signature database 612. However, parts of the signature database may be excluded from a search to decrease the amount comparisons to be performed.

A possible unauthorized transmission is detectable if any one or more signatures in the set of signatures of an extracted object matches one or more signatures in signature database 612 associated with a registered document. Detection tolerances are usually configurable. For example, the system may be configured so that at least two signatures must match before a document is deemed unauthorized. Additionally, special rules may be implemented that make a transmission authorized (for example, if the source address is authorized to transmit any documents off the network).

An embodiment of a registration module is illustrated in FIG. 7. As discussed above, a user may select a document to be registered. Registration engine 702 generates signatures for the document and forwards the document to content storage and the generated signatures to signature database 612. Generated signatures are associated with a document, for example, by including a pointer to the document or to some attribute to identify the document.

The registration engine calculates signatures for a captured object and forwards them to search engine 710. Search engine 710 queries signature database 612 to compare the signatures of a captured object to the document signatures stored in signature database 612. Assuming for the purposes of illustration, that the captured object is a Word document that contains a pasted paragraph from registered PowerPoint document, at least one signature of the registered PowerPoint signatures will match a signature of the captured Word document. This type of event is referred to as the detection of an unauthorized transfer, a registered content transfer, or other similarly descriptive term.

When a registered content transfer is detected, the transmission may be halted or allowed with or without warning to the sender. In the event of a detected registered content transfer, search engine 710 may activate notification module 712, which sends an alert to the registered document owner. Notification module 712 may send different alerts (including different user options) based on the user preference associated with the registration and the capabilities of the registration system.

An alert indicates that an attempt (successful or unsuccessful) to transfer a registered content off the network has been made. Additionally, an alert may provide information regarding the transfer, such as source IP, destination IP, any other information contained in the tag of the captured object, or some other derived information, such as the name of the person who transferred the document off the network. Alerts are provided to one or more users via e-mail, instant message (IM), page, etc. based on the registration parameters. For example, if the registration parameters dictate that an alert is only to be sent to the entity or user who requested registration of a document then no other entity or user will receive an alert.

If the delivery of a captured object is halted (the transfer is not completed), the user who registered the document may need to provide consent to allow the transfer to complete. Accordingly, an alert may contain some or all of the information described above and additionally contain a selection mechanism, such as one or two buttons—to allow the user to indicate whether the transfer of the captured object is eligible for completing. If the user elects to allow the transfer, (for example, because he is aware that someone is emailing a part of a registered document (such as a boss asking his secretary to send an email), the transfer is executed, and the captured object is allowed to leave the network.

If the user disallows the transfer, the captured object is not allowed off the network and delivery is permanently halted. Several halting techniques may be used such as having the registration system proxy the connection between the network and the outside, using a black hole technique (discarding the packets without notice if the transfer is disallowed), a poison technique (inserting additional packets onto the network to cause the sender's connection to fail), etc.

Figure 8:
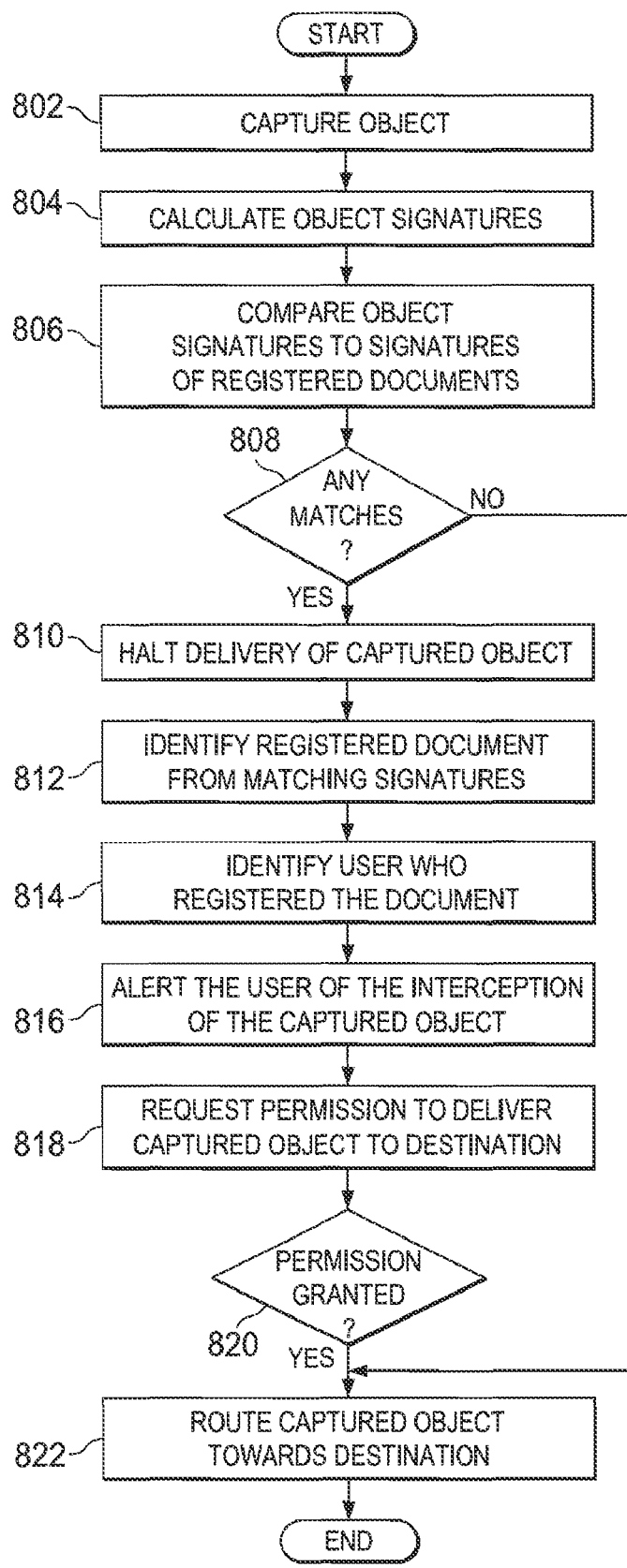
FIG. 8 illustrates an embodiment of the flow of the operation of a registration module.

FIG. 8 illustrates an embodiment of the flow of the operation of a registration module. An object is captured at step 802. This object was sent from an internal network source and designated for delivery inside and/or outside of the network. A signature or signatures are generated for this captured object at step 804. This signature or signatures are generated in a manner as described earlier. The signatures of the captured document are compared to the signatures of registered documents at step 806. For example, search engine 710 queries the signature database, which houses the signatures for registers, documents, and compares these registered document signatures to the signatures generated for the captured document.

If there are no matches at step 808, then the captured object is routed toward its destination at step 822. This routing is allowed to take place because the captured object has been deemed to not contain any material that has been registered with the system as warranting protection. If there is a match at step 808, further processing is needed. In an embodiment, the delivery of the captured object is halted at step 810. Halting delivery prevents any questionable objects from leaving the network. Regardless if the delivery is halted or not, the registered document that has signatures that match the captured object's signatures is identified at step 812. Furthermore, the identity of the user or entity that registered the document is ascertained at step 814.

The user or entity of the matching registered document is alerted to this attempt to transmit registered material at step 816. This alert may be sent to the registered user or entity in real-time, be a part of a log to be checked, or be sent to the registered user or entity at a later point in time. In an embodiment, an alert is sent to the party attempting to transmit the captured object that the captured object contains registered information. A request to allow delivery of the captured object may be made to the registered user or entity at step 818. As described earlier, there are situations in which a captured object that contains registered material should be allowed to be delivered. If the permission is granted at step 820, the captured object is routed toward its destination at step 822. If permission is not granted, the captured object is not allowed to leave the network.

Signature Generation

There are various methods and processes by which the signatures are generated, for example, in registration engine 702 in FIG. 7. One embodiment of a flow to generate signatures is illustrated in FIG. 9. The content of a document (register or intercepted) is extracted and/or decoded depending on the type of content contained in the document at step 910. The content is extracted by removing the "encapsulation" of the document. For example, if the document is a Microsoft Word file, then the textual content of the file is extracted and the specific MS Word formatting is removed. If the document is a PDF file, the content has to be additionally decoded, as the PDF format utilizes a content encoding scheme.

To perform the text extraction/decoding at step 910, the content type of the document is detected (for example, from the tag associated with the document). Then, the proper extractor/decoder is selected based on the content type. An extractor and/or decoder used for each content type extracts and/or decodes the content of the document as required. Several off the shelf products are available, such as the PDFto-Text software, may be used for this purpose. In one embodiment, a unique extractor and/or decoder is used for each possible content type. In another embodiment, a more generic extractor and/or decoder is utilized.

The text content resulting from the extraction/decoding is normalized at step 920. Normalization includes removing excess delimiters from the text. Delimiters are characters used to separate text, such as a space, a comma, a semicolon, a slash, tab, etc. For example, the extracted text version of a Microsoft Excel spreadsheet may have two slashes between all table entries and the normalized text may have only one slash between each table entry or it may have one space between each table entry and one space between the words and numbers of the text extracted from each entry.

Normalization may also include delimiting items in an intelligent manner. For example, while credit card numbers generally have spaces between them they are a single item. Similarly, e-mail addresses that look like several words are a single item in the normalized text content. Strings and text identified as irrelevant can be discarded as part of the normalization procedure. In one embodiment, such evaluations are made by comparison to a pattern. For example, a pattern for a social security number may be XXX-XX-XXXX, XXXXXXXXX, or XXX XX XXXX, where each X is a digit from 0-9. An example pattern for an email address is word@word.three-letter-word. Similarly, irrelevant (non-unique) stings, such as copyright notices, can have associated patterns.

The pattern comparison is prioritized in one embodiment. For example, if an email address is considered more restrictive than a proper name and a particular string could be either an email address or a proper name, the string is first tested as a possible email address. A string matching the email pattern is classified as an email address and normalized as such. If, however, it is determined that the string is not an email address, then the string is tested against the proper name pattern (for example, a combination of known names). If this produces a match, then the string is normalized as a proper name. Otherwise, the string is normalized as any other normal word.

By comparing the normalization patterns against the string to be normalized in sequence, an implicit pattern hierarchy is established. In one embodiment, the hierarchy is organized such that the more restrictive, or unique, a pattern is, the higher its priority. In other words, the more restrictive the pattern, the earlier it is compared with the string. Any number of normalization patterns useable and the list of patterns may be configurable to account for the needs of a particular enterprise.

Normalization may also include discarding text that is irrelevant for signature generation purposes. For example, text that is known not to be unique to the document may be considered irrelevant. The copyright notice that begins a source code document, such as a C++ source file, is generally not relevant for signature generation, since every source code document of the enterprise has the identical textual notice and would be ignored. Irrelevant text is identified based on matching an enumerated list of known irrelevant text or by keeping count of certain text and thus identifying frequently reoccurring strings (such as strings occurring above a certain threshold rate) as non-unique and thus irrelevant. Other processes to identify irrelevant text include, but are not limited to, identification through pattern matching, identification by matching against a template, and heuristic methods requiring parsing of examples of other documents of the same type.

The delimitated text items of the normalized text content are tokenized, and, converted into a list of tokens at step 930. In one embodiment, tokenizing involves only listing the delimited items. In another embodiment, each item is converted to a token of fixed size. Text items may be hashed into a fixed or configurable hash site such as binary number (for example, an 8-bit token). An example hash function that may be used for tokenizing is MD5. The document signatures are generated from the list of tokens at step 940.

An example embodiment of a flow for changing tokens into document signatures is described with reference to FIG. 10. The first M tokens from a list of tokens generated from a document are selected at step 1010, where M is an appropriate positive integer value. For example, if M is 10, then the first ten tokens from a list are selected. Of the selected M tokens, N special tokens are selected at step 1020, N also being an appropriate positive integer and is less than, or equal to, M. The N special tokens may be selected at random, in part based on size, and/or in part on obscurity. Tokens that occur less frequently are more obscure and thus more likely to be selected as a special token. A token dictionary may be provided to log the frequency of tokens. The special tokens may also be selected based on the type of the token as defined by the normalization pattern matched by the source string. As set forth above, during the normalization process, some strings are identified as higher priority text (such as email addresses, credit card numbers, etc.) the tokenization of which results in higher priority tokens. Thus, the selection of the N special tokens may consider the source string.

Tokens may also have an associated priority value that may be used in selecting the special tokens. The priority value can be based on the priority of the normalization pattern matched by the token (for example, social security number, credit card number, email address, etc.) or based on additional signs of uniqueness, such as the frequency of capitalized letters, and the inclusion of special rare characters (for example, "^", "*", "@", etc.)

A hash signature of the N special tokens is calculated, resulting in one of the document signatures at step 1030. The hash is calculable in a number or ways. Special tokens may be hashed individually, or in groups, and the resultant hashes concatenated to form a signature, concatenated prior to the calculation, or hashed without concatenation at all. Any appropriate hash function and/or any combination of these hashing techniques may be utilized. In one embodiment, before the next M tokens are selected, P tokens of the list of tokens are skipped from the first token of the M tokens. However, if P is zero, the next M tokens would be identical to the current M tokens, and therefore zero is not an allowed value for P. If P is less than M, then the next set of M tokens will overlap with the current set of M tokens. If P is equal to M, then the first token of the next M tokens will immediately follow the last token of the current M tokens. If P is greater than M, then some tokens are skipped between the next and the current M tokens.

A determination is made as to whether all signatures have been generated at step 1040. This is be done by observing if there are less than M tokens remaining on the list, hence, the next M tokens cannot be selected. If all signatures for the document have been generated, then the process terminates. However, if more signatures are to be generated for the document the next M tokens are selected by reverting to selecting tokens at step 1010.

There are numerous other ways to perform each of the proceedings of FIGS. 9 and 10. Some blocks are skipped entirely in some embodiments. For example, step 930 in FIG. 9 may be skipped and the signatures generated directly from the normalized text. Regarding FIG. 10, various values may be used for M, N, and P, with each combination generating a different number of signatures. The specific configuration of M, N, and P thus depends on the needs of the enterprise and the volume and content of captured and registered documents. In an embodiment, M ranges between 8-20, N between 8-10, and P between 4-40.

Figure 11:
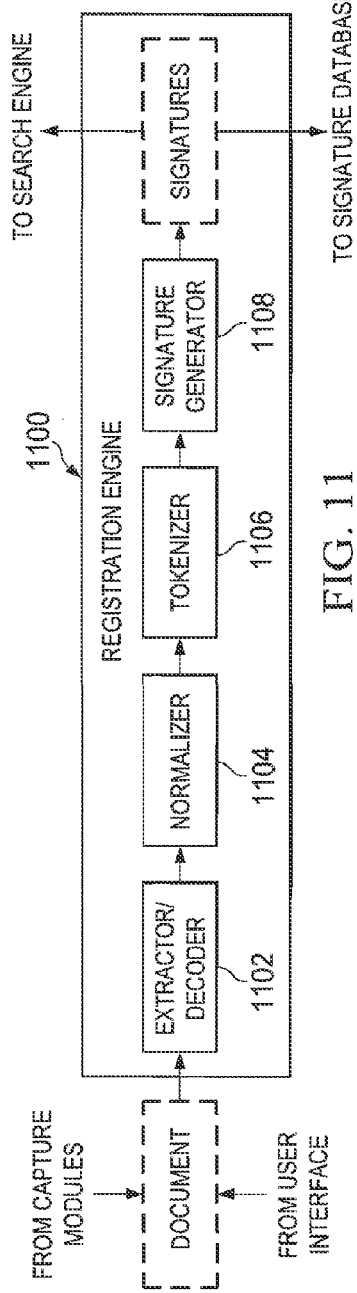
FIG. 11 illustrates an embodiment of a registration engine that generates signatures for documents.

An embodiment, of a registration engine that generates signatures for documents is illustrated in FIG. 11. The registration engine 1100 accepts documents, and generates signatures over these documents. The document may be one registered via the user interface, or one captured by the capture modules, as described earlier. The registration engine 1100 includes an extractor/decoder 1102 to perform the functionality described with reference to step 910 of FIG. 9. The registration engine also includes a normalizer 1104 to perform the functionality described with reference to step 920 of FIG. 9. A tokenizer 1106 performs the functionality described with reference to step 930 of FIG. 9. A signature generator 1108 performs the functionality described with reference to step 940 of FIG. 9. The signature 1108 generator may implement the process described with reference to FIG. 10.

Indexing

Searching for information about captured objects stored on a disk (either local or networked) is generally slow as each object must first be retrieved from the disk and then examined against the search criteria. As described below, by creating one or more fast storage (such as Random Access Memory, flash, processor cache, etc.) indexes containing information (such as metadata information and/or keywords) about the objects (and therefore the content) stored on a disk, the task of searching for information regarding captured objects is performed quicker.

Figure 12:
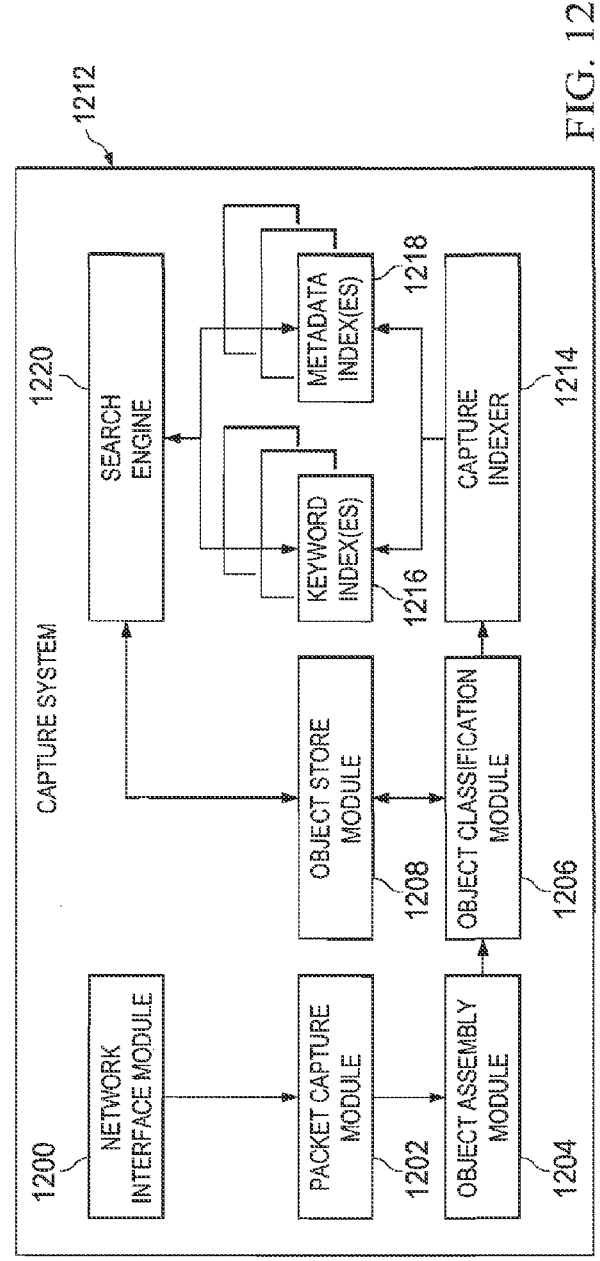
FIG. 12 illustrates an example embodiment of a network capture device.

FIG. 12 illustrates an example embodiment of a network capture system 1212 utilizing indexing. This system can include a network interface module 1200, packet capture module 1202, object assembly module 1204, object classification module 1206, and an object store module 1208. These modules operate in a manner consistent with those modules described earlier (for example, in FIG. 3). During typical operation, the indexing network capture device captures and analyzes packet streams as described earlier.

Capture system 1212 also includes a capture indexer 1214 to create entries into word indexes 1216 consisting of a dictionary (or lists) of keywords found in all captured content (flows, documents, etc.) and/or entries into metadata indexes (or lists) 1218 based on captured content. In an embodiment, capture indexer 1214 is a part of object classification module 1206. Keyword entries may point to a data structure containing the objects containing the keyword and/or point to a list of objects containing the keyword. A keyword is a word, phrase, name, or other alphanumeric term that exists within common textual content such as an email, Microsoft Office document, or similar content. Typically, only currently used indexes are stored in cache or RAM on the capture device, however, one or more of these indexes may also be stored on disk either locally or remotely. The persistence of these indexes to disk may be done on command or periodically. However, searching is faster if more indexes that are in RAM or other fast storage device rather than on disk.

A metadata index is a tree structure for an individual property (such as IP address) and a subsequent list of captured objects in capture storage device that have said property (such as "transmitted from the specific IP addresses"). Metadata includes properties describing the network characteristics of the content containing keywords. Examples of network characteristics include, but are not limited to, the source and destination addresses (Internet Protocol (IP) addresses), time, and date of the transmission, size, and name of the content, and protocol used to transmit the content. Additional descriptive properties may be used to describe the device upon which the content was captured, the user, viewer of the captured content or security settings of the captured content, etc. Much of this information is also found in tags as described earlier. While keyword index 1216 and metadata index 1218 are illustrated as a being separate entities, they may be a part of a single file per time period.

Because of the two-index system, textual and numeric properties may be indexed using different indexing algorithms (for example, a keyword index may be a hash list and a metadata index a B-tree, etc.). Furthermore, metadata indexes that represent properties that may be enumerated (that have a limited number of possible values) may use different algorithms than those with unbounded properties. An example of an enumerated property is "protocol," as there are a limited and known number of protocols that are supported by a network capture device. An example of an unbounded property is "size," as an infinite number of possible sizes exist for the content that will be captured by a network capture device.

The capture indexer utilizes adaptive time-based dictionary granularity and creates new indexes over time, and therefore should prevent any specific index from growing unbounded. Accordingly, a specific maximum search time to find an arbitrary element in a tree or hash list is maintained. The temporal basis for creating a new index is determined by a plurality of factors including, but not limited to: a) the number of keywords or metadata elements that have been inserted into the index; b) the number of captured objects listed in the index; c) the aggregate size of the index; and d) the aggregate size of captured content being indexed. In an embodiment, the creation of new indices is additionally controlled by a user or administrator employing different heuristics to optimize search performance.

A search engine 1220 searches the indexes and returns a list of captured documents from object storage module 1208 that match specified search criteria. This search (or query) searches for each criteria component individually to retrieve a list of tags associated with objects in object storage module 1208 for each criteria and then selects only those tags associated with objects that exist within all returned lists. Alternatively, selections may be made based on a captured object not existing within a returned list. An example of such a selection is the evaluation of the criteria "contains keyword confidential but not keyword sample." In this case, only objects that exist within the first returned list (contains "confidential") but not within the second returned list (contains "sample") would be qualified because of the search. While search engine 1220 is illustrated as a component inside of capture system 1212, it may exist on an external system. Additionally, search engine 1220 may also have capabilities similar to those of the earlier described search engine. Similarly, a capture/registration system, as described before, may also utilize a capture indexer, indexes, and search engine.

Figure 13:
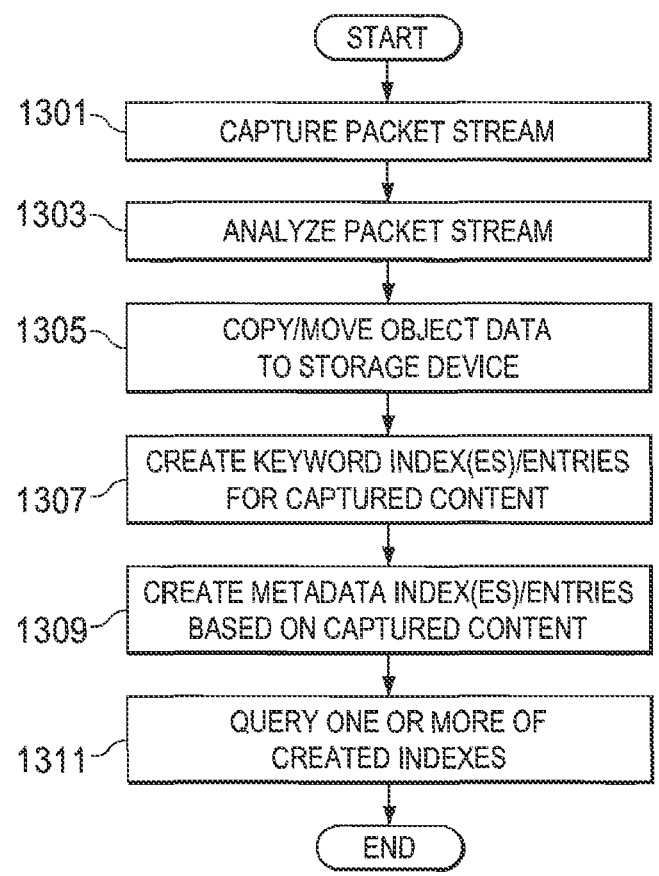
FIG. 13 illustrates an example indexing and searching flow.

FIG. 13 illustrates an example indexing and searching flow. At step 1301, a packet stream is captured. This packet stream is analyzed at step 1303 and a copy of the object and/or object data is moved to a storage device at step 1305. The capturing and analyzing of packet streams and moving objects and/or object data has been previously described. Keyword index entries for the captured content are created at step 1307. This entry creation is performed by the capture indexer or equivalent. A keyword index may also be created, as necessary, at this point. Metadata index entries for the captured content are created at step 1309. This entry creation is performed by the capture indexer or equivalent. A metadata index may also be created, as necessary, at this point. Finally, one or more of the indexes (metadata or keyword) is queried to find a particular object in storage at step 1311. By querying the indexes instead of the objects themselves, search time is greatly improved. If a match is found, the object, objects, and/or tag information may be retrieved from storage as desired.

Figure 14:
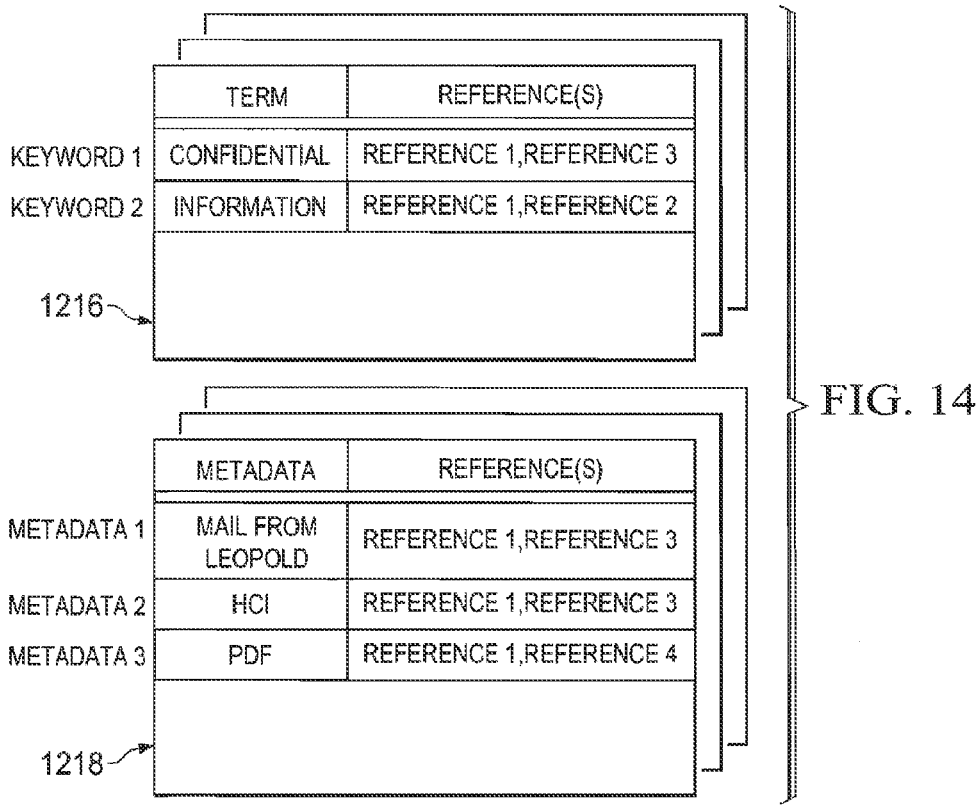
FIG. 14 illustrates an example of a keyword and metadata index at a particular point in time.

FIG. 14 illustrates an example of a keyword and metadata index at a particular point in time. Each entry in keyword index 1216 data structure includes both a keyword found in a document and a reference to that document. For example, keyword index 1216 data structure includes keywords "confidential" and "information," The keyword "confidential" was found by the capture system to be in documents "1" and "2." Accordingly, keyword index 1216 includes references to those documents for "confidential." Similarly, each entry in metadata index 1218 data structure includes both metadata data associated with a document and a reference to that document. For example, metadata index 1218 data structure includes metadata "mailfrom Leopold" (indicating that an email originated from someone named "Leopold" contained a specific document), "health care information (HCI)" (indicating that a document included, generically, HCI), and "PDF" (indicating that a document was a PDF file).

The use of both a keyword index 1216 and a metadata index 1218 allows for queries not possible with either a traditional keyword or metadata query. For example, by creating new index periodically (thereby having multiple indexes), a query of documents by time in addition to content is possible. In contrast, while a normal Internet search engine may be able to determine if a particular website has a particular keyword, that same search engine cannot determine if it had that same keyword 15 minutes ago, 1 week ago, etc. as these search engines employ one large index that does not account for time.

Additionally, previously there were no queries that could sort through both keyword and metadata. For example, a search for an email from a person named "Leopold," that contains a PDF attachment, HCI, and includes (either in the PDF or in the body of the email) the words "confidential" and "information" was impossible. Database queries only search for metadata stored in indexed columns (e.g., such as if the content is a PDF file, mail from information, etc.), These queries do not account for keywords, in other words, they cannot search for a particular document containing the words "confidential" and "information." Keyword queries (such as a Google query) cannot search for metadata such as the metadata described above.

Figure 15:
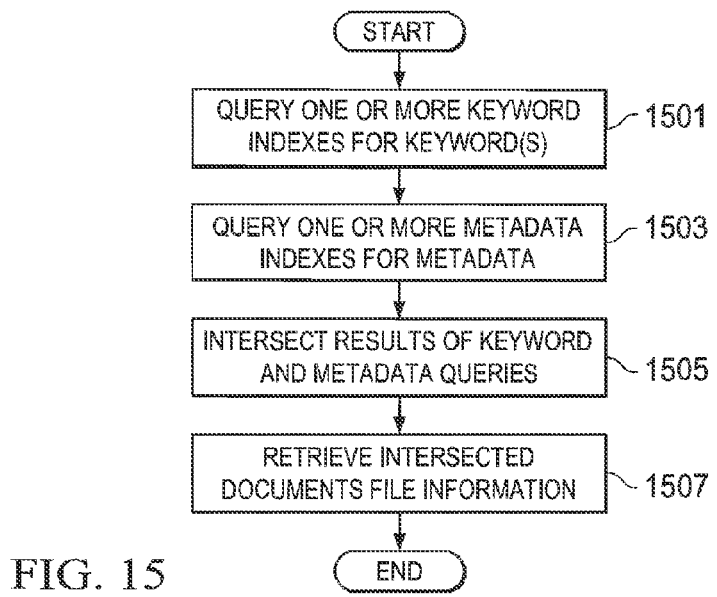
FIG. 15 illustrates a simplified example querying flow using metadata and keyword indexing.

FIG. 15 illustrates a simplified example querying flow using metadata and keyword indexing. At step 1501, one or more keyword indexes are queried for one or more keywords. For example, in the query described above for the entries of FIG. 14, keyword indexes 1216 are queried for both "confidential" and "information." The result of this query is that "confidential" and "information" is only collectively found in reference 1. Essentially, the result of the query is the intersection of a query for "confidential" and a query for "information." Of course any Boolean operator such as OR, NOT, etc. may be used instead of or in conjunction with the Boolean AND. In addition, natural language based queries may be supported. Metadata indexes 1218 are similarly queried at step 1503. For example, in the email query described above for the entries of FIG. 14, keyword indexes 1218 are queried for "HCI," "mailfrom Leopold," and "PDF." The result of this query is that this set of metadata is only collectively found in reference 1.

Because this search was not bound by a time frame, all available keyword and metadata indexes would be queried for these keywords. However, the number of keyword indexes queried is reduced for a time frame limited search. At step 1505, the results of the previous queries are intersected to create a set of references that satisfy the overall query. In the example above, the result of this intersection would be reference 1. Accordingly, only reference 1 would satisfy the collective query, as it is the only reference to have all of the required criteria. At step 1507, the file information associated with the references from the intersection of step 1505 is retrieved. Typically, as described earlier, this information is stored as a tag in a tag database and is retrieved from there. However, the actual documents associated with the references may be retrieved.

While this simplified query flow queries a keyword index prior to a metadata index query the reverse order may be performed. Additionally, many other variations on the simplified flow are possible. For example, while not as efficient, a query flow that performs an intersection after each index query (or after two, three, etc. queries) may be utilized. Another example is performing a query for a first specific time period (querying a first particular set of one keyword and one metadata index that were created/updated during the same time period), intersecting the results of the first query, performing a query on a second specific time period (querying a second particular set of one keyword and one metadata index that were created/updated during the same time period), intersecting the results of first query with the results of the second query, etc. Yet another example is performing a query for a first specific time period (querying a first particular set of one keyword and one metadata index that were created/updated during the same time period), intersecting the results of the first query, performing a query on a second specific time period (querying a second particular set of one keyword and one metadata index that were created/updated during the same time period), intersecting the results of the second query, etc. and when all (or some pre-determined number of) queries have been performed and intersections calculated for each specific time period, intersecting all of the specific period intersection results.

An optimization for the above-described system uses adaptive cache alignment. Adaptive cache alignment means that the capture indexer (or some other entity including a user) aligns memory and/or disk data structures of the indexes (or index entries) to be the size of the system's processor's cache lines (for example, Level 2 (L2) memory cache within the system's processor this processor has not been illustrated in this application in order to not unnecessarily clutter the FIGURES). If the processor's capabilities are unknown, upon initialization, the capture device's processor is examined and a determination of the appropriate cache alignment is made based upon that examination. Of course, the cache alignment may also be pre-determined if the exact system specifications are known. In another embodiment, the capture indexer (or other entity) examines the block size of the file system (of the fundamental storage unit) and uses this size as part of the cache alignment. Additionally, memory (such as RAM, cache, etc.) used by the capture indexer may be pre-allocated to remove the overhead of allocating memory during operation. Furthermore, algorithms operating on the memory are tolerant of uninitialized values being present upon first use. This allows for the usage of the memory without the latency associated with clearing or resetting the memory to a known state or value.

Figure 16:
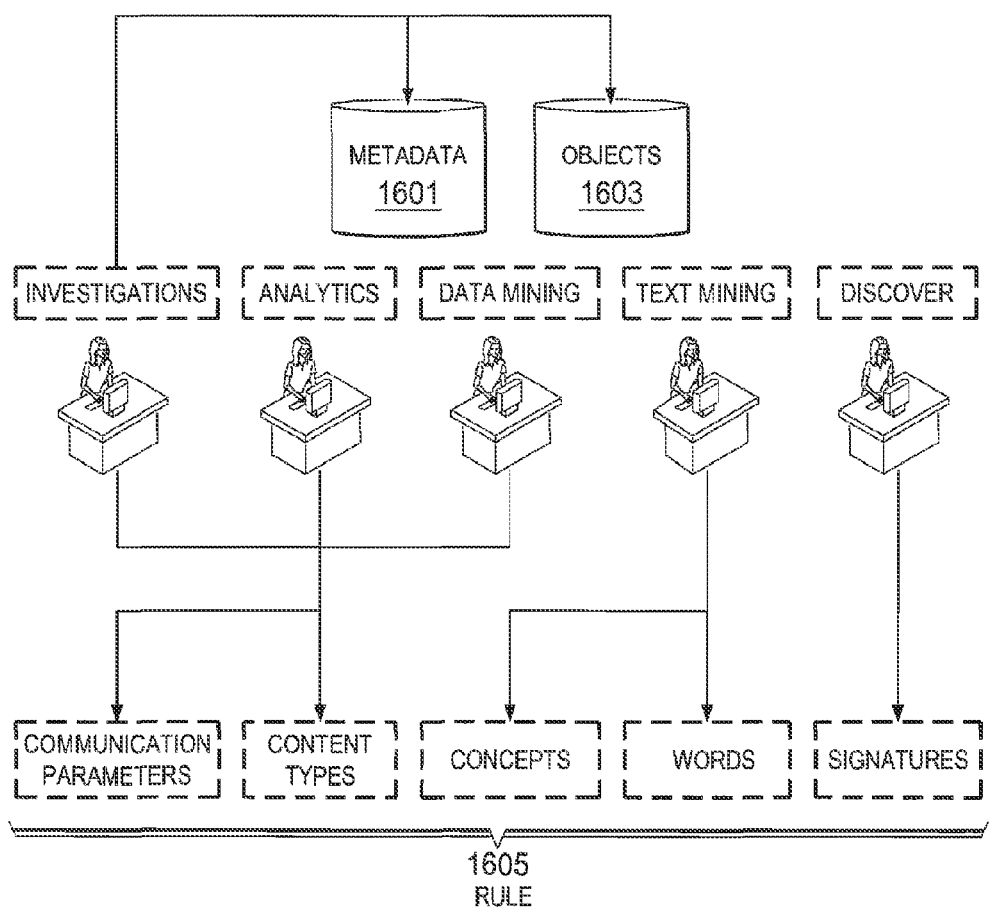
FIG. 16 illustrates an embodiment of the interactions between different aspects of a capture system and user activities for creating a rule or policy used for interpreting captured or registered data.

FIG. 16 illustrates an embodiment of the interactions between different aspects of a capture system and user activities for creating a rule or policy used for interpreting captured or registered data. FIG. 16 includes a set of rules 1605, a metadata element 1601, an objects element 1603, and a number of activities that lie between/interface via these items. Rule 1605 may consist of one or more parts as described below. The first part of a typical rule 1605 is communication parameters. The communication parameters dictate what communication information associated with the transaction should be searched. Example communication parameters include: MAC address, VLAN, source IP address, destination IP address, hostnames, source locations, destination locations, email addresses, port number, and protocols. For example, a rule may be created to look at all transactions originating from a particular MAC address (ostensibly from the same computer) that used a certain port number (like port number 21, which is typically associated with FTP transactions) and to "capture" those transactions that meet this requirement.

Another part of a typical rule 1605 is the content and/or sub-content types associated with the rule. Some example choices for content types (as determined, in one embodiment, by the object classification module 30) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, WebMail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catch all categories).

Another part of a typical rule is concepts. Concepts are pattern-matching tools that use text patterns or regular expressions to identify collection of related objects. For example, credit cards use a wide range of different numbering patters, which may be collected into a single concept and applied against captured data. A rule may also include words or patterns associated with an object processed by the capture system. For example, a capture rule may dictate that all objects that have the phrase "Aw, hamburgers" be captured. Similarly, a query rule may search all tags and/or objects that contained the phrase "Aw, hamburgers."

Finally, a rule may also include a signature or signatures associated with a particular object or some portion thereof. In one embodiment, a well-known hash, such as MD5 or SHA1 is used. In one embodiment, the signature is a digital cryptographic signature. In one embodiment, a digital cryptographic signature is a hash signature that is signed with the private key of capture system 200. Only capture system 200 knows its own private key, thus, the integrity of the stored object may be verified by comparing a hash of the stored object to the signature decrypted with the public key of capture system 200, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, an alarm is generated to alert the user that the object displayed may not be identical to the object originally captured.

A group of rules may be combined to form a policy. Policies describe a bigger picture such as "what information should be protected?", "who is sending what, where?", "what new policies are needed to best protect our assets?", etc. Using rules and policies, a user may, for example, tune the system to perform certain actions when an incident is found, find specific concepts that have been programmed, or create and use templates to expedite search processes. Capture rules are stored either in one or more databases in the capture system, or external to the capture system. If the rules are stored externally, they will need to be loaded onto, or be accessible by, the capture system during operation.

As described earlier, a capture system includes a tag database 500 to store and historical content database 502. Within content store 502 are files 504 grouped by content type. Object store module 506 may be internal to a capture system or external (entirely or in part) using, for example, some network storage technique such as network attached storage (NAS), storage area network (SAN), or other database. In an embodiment, content store 502 is a canonical storage location that is simply a place to deposit the captured objects. The indexing of the objects stored in the content store 502 is accomplished using a tag database 500. Tag database 500 is a database data structure in which each record is a "tag" that indexes an object in content store 502 and contains relevant information about the stored object. Example tag structures have been illustrated in Tables 1 and 2. These databases are subjected to investigations, analytics, and/or data mining, etc. to help create a rule 1605 or policy.

The activities of FIG. 16 can be linked to rules 1605. Investigations analyze and assess specific communications by topic, user, or destination. For example, one may investigate all emails that originated with a recently terminated disgruntled employee to determine if the employee transferred out valuable and/or proprietary information from the internal network. When performing analytics, the results of the application of the rules and policies of the capture system are reviewed. Additionally, data mining results are reviewed. Analytics synthesizes aggregated transaction data, identifies where specific data is going, determines who is sending it, and summarize the commonalities among transactions. A data mining operation sifts through one or more of the databases (metadata (tag) and/or object) for specific information such as where an enterprise's content going, who is accessing this content, and when it is being accessed. Additionally, data mining provides associations between various communications or accesses, time series, anomalies by various dimensions, clustering, classification, content, users, resources, servers, visibility, norms, and exceptions. From this information, a content security policy may be created. Tags supply communication parameters such as a capture timestamp, MAC address, VLAN, source address, destination address, hostnames, source locations, destination locations, email addresses, port numbers, protocols, etc.

Text mining sifts through one or more of the databases (metadata (tag) and/or object) for specific textual information. For example, a search of "Attorney Client Privileged" may be performed using text mining. The process of discovery by a capture system classifies content at rest on the network associated with the capture system using predefined and custom policies. For example, one may desire to discover all documents with the phrase "Privileged and Confidential" in them. This phrase has a particular signature associated with it. As illustrated, through discovery signatures for objects are created.

Figure 17:
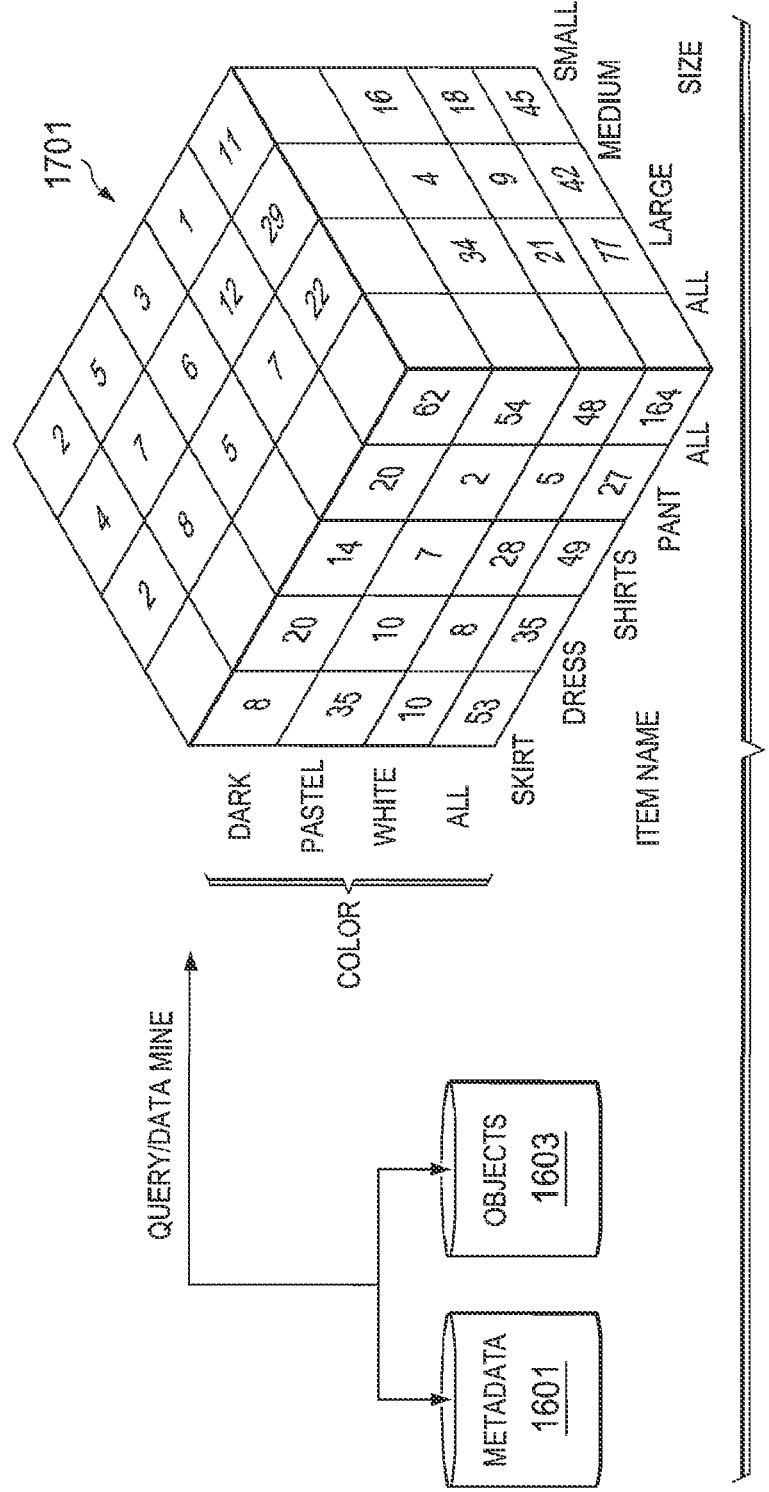
FIG. 17 illustrates an embodiment of using a query of tag and historical databases to generate an online analytical processing (OLAP) cube.

FIG. 17 illustrates an embodiment of using a query of tag and historical databases to generate an online analytical processing (OLAP) cube. OLAP cubes quickly provide answers to analytical queries that are multidimensional in nature. As illustrated in FIG. 17, an OLAP cube may be created from records (tags and/or objects) previously captured by, or registered with, a capture/registration system. The use of OLAP allows an end-user to quickly see trends and patterns in data that may have otherwise been buried in billions of records. From these trends, a rule or policy for a capture system may be created.

For example, FIG. 17 illustrates three different generic categories that have been noted by a capture/registration system: color, item name, and size. A query (or mining operation(s)) has been performed on a tag database 1701 and on an object database 1603 for information on different types of items and their color and size and an OLAP cube has been created from the retrieved information. For example, the query has found that ten white skirts have been sold, two of which were a size large. This information is readily visible using an OLAP cube. If traditional techniques were used a user would either have to manually search through three different query results (the separate results for item, color, and size) or create a script or other filter to try to narrow down the results into the desired data. Obviously, as the number of items per axis increase, the task of trying to determine a specific combination becomes more daunting. Moreover, a user should also have to have some inclination as to how to narrow the search results in order to filter them. Of course, the "cube" may have more than three axes. Additionally, new rules may be tested against the historic databases (tags and objects) to ensure accuracy prior to deployment and adjusted accordingly.

Figure 18:
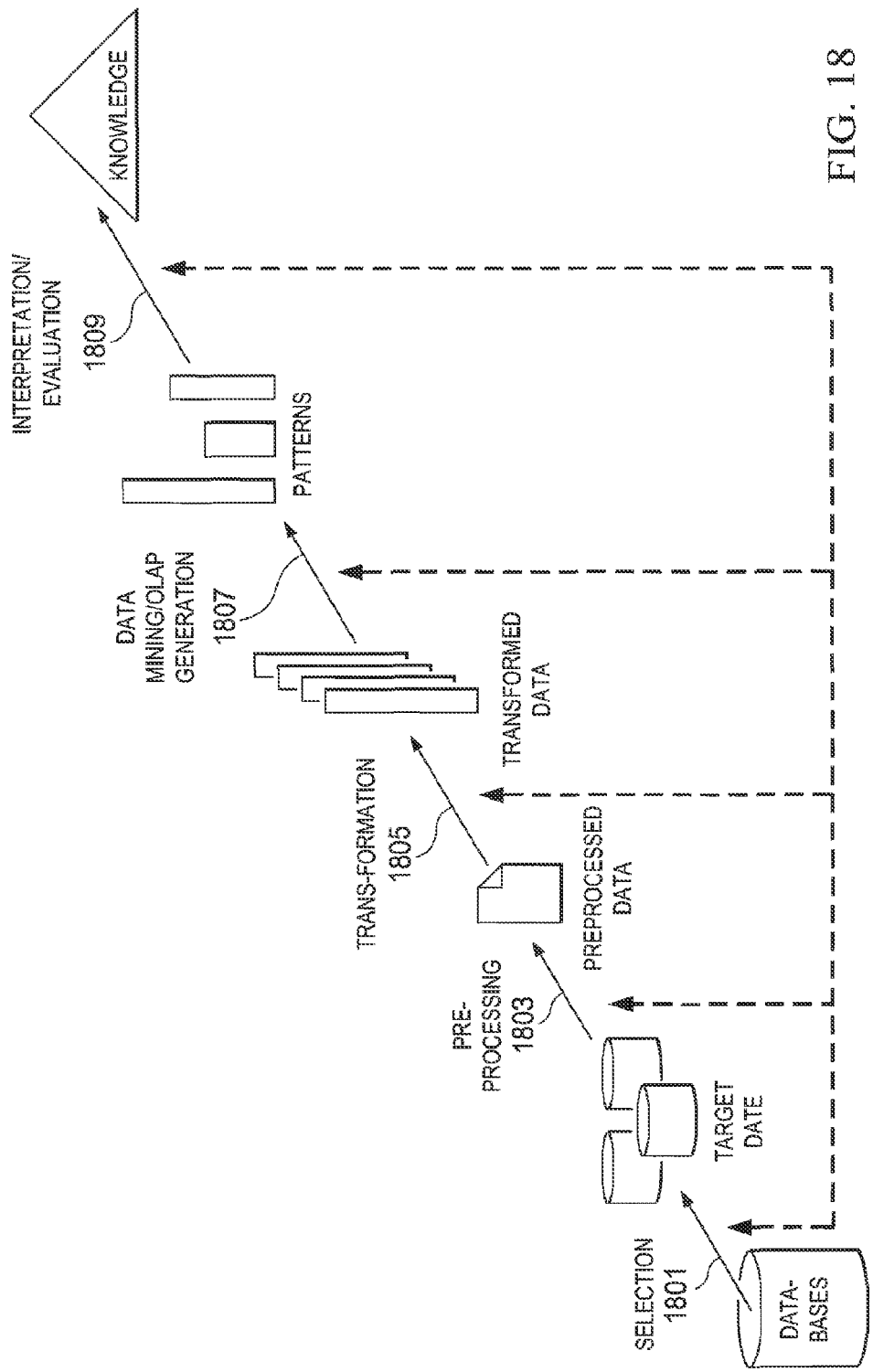
FIG. 18 graphically illustrates an embodiment of a method for the generation of a cube.

FIG. 18 graphically illustrates an embodiment of a method for the generation of a cube. At step 1801, one or more databases are selected for processing. For example, a tag and/or object database is selected for data mining. The selection of the database(s) may also be further refined by date and time if the information in the tag and/or object database(s) is conducive to such a refinement. In the embodiments described earlier in which the database structure was divided by time this is a useful refinement in that it quickly narrows the search and the number of tags and/or objects that will be mined.

At step 1803, the databases are preprocessed by applying a filter. The filter parameters are definable by a user (received by the capture system) and typically fall along the lines of the information stored by a tag. For example, any element of a tag (communication parameters, content type, concept, word, or signature) may be used to filter the results from the data mining operation. The preprocessed information is transformed into "buckets" at step 1805. A bucket consists of a group of related information. For example, one bucket shown in FIG. 17 is size. A bucket may be further granulated into sub-buckets. Typically, the buckets are the basis for the axes of an OLAP cube. Note that any type of OLAP element (not just a cube) may be used in conjunction with the discussed concept.

At step 1807, the transformed data is mined and assembled into one or more OLAP cubes. Mining is the non-trivial extraction of previously unknown and potentially useful information from the stored data. The results of mining as shown by one or more OLAP cubes may include one or more of the following: 1) clustering of data or actions for example, repeated email messages from an employee to a competitor); 2) classification of data or actions (for example, an object that was not previously thought to be important may be identified or reclassified); 3) association of actions or objects with a user, group, project, etc. (for example, an object emailed from one person to a collection of people may indicate that the objected is associated not only with the originator but also with the people in the group); 4) content; 5) users; 6) resources (for example, the bandwidth consumed by a particular user or at a particular time); 7) servers; 8) time; 9) visibility; 10) norms; and/or 11) exceptions. Mining answers the questions of "where is content going?", "who is accessing the content?", "when is content access?", and "who or what is the content associated with?" Additionally, mining provides a time series to associate with content and anomalies by various dimensions such as content location and content access thresholds.

Mining OLAP cubes are interpreted and evaluated (analytics are performed) at step 1809. At this point, a rule and/or policy may be created based on the OLAP cube(s). It should be noted that one or more of these operations may be performed in parallel or in a different order than that illustrated. Note also that from an initial starting point of simple data (e.g., in a database/repository), the system has achieved a new level of knowledge based on this data. This valuable progress is depicted in FIG. 18.

Figure 19:
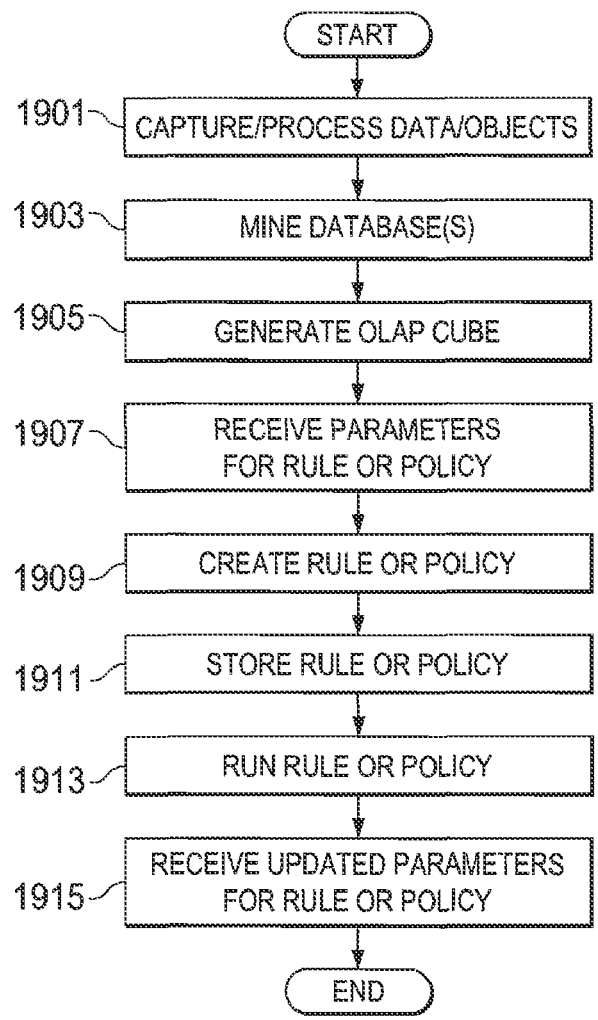
FIG. 19 illustrates an embodiment of a method to generate a rule from an OLAP cube.

FIG. 19 illustrates an embodiment of a method to generate a rule from an OLAP cube. At step 1901, an object or objects are captured or registered with a capture system and processed. As described earlier, when an object is captured or registered, the object is stored in one or more object storages locations and a tag describing the object is created and/or modified and stored in a tag database. At step 1903, the tag and/or object database is mined to sort through the large amounts of data that are stored in the tag and object databases and picking out relevant information. A user may define what constitutes relevant information or the system may make an educated guess based on behavioral patterns (such as an abnormal number of messages originating from one user compared to the rest of the users that are handled by the system).

One or more OLAP cubes are generated from the data retrieved from the mining operation(s) at step 1905. At step 1907, the parameters that define or refine a rule and/or policy are received from a user. These parameters are at least partly based on the information gleaned from the OLAP cubes. These parameters may include any one of the rule components described earlier. A rule and/or policy are created from these parameters at step 1909. The rule and/or policy are stored either in the capture system (RAM or disk) or in a database or other storage device accessible by the capture system at step 1911. At step 1913, the rule and/or policy are run against the existing databases to determine if it provides the desired result. If the rule and/or policy do not produce the desired result, it may be tuned at step 1915 by a user that provides different parameters for the rule and/or policy. In an alternative embodiment, the rule and/or stored after the rule and/or policy has been run.

Figure 20:
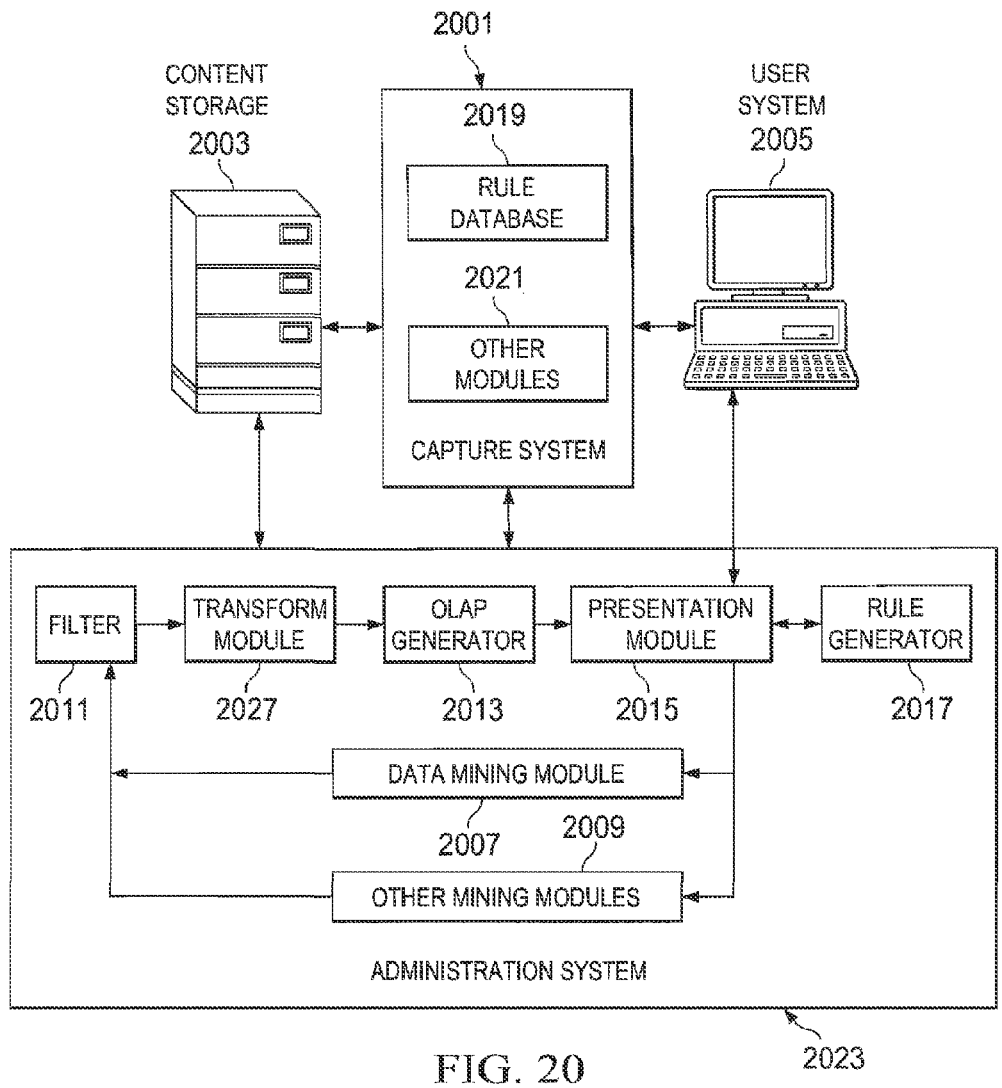
FIG. 20 illustrates an embodiment of a system that uses OLAP to help a user define a rule and/or policy.

FIG. 20 illustrates an embodiment of a system that uses OLAP to help a user define a rule and/or policy. FIG. 20 includes a capture system 2001, which includes a rule database 2019 and other modules 2021. FIG. 20 also depicts a content storage element 2003 (that includes tags and/or objects, etc.) and a user system 2005. Some of these items may be coupled to an administration system 2023, which may include a set of filters 2011, a transform module 2027, an OLAP generator 2013, a presentation module 2015, a rule generator 2017, a data-mining module 2007, and other mining modules 2009. Capture system 2001, as described above, captures and/or registers objects as required by the capture system's 2001 rules and policies. In order to simplify the illustration, the modules previously described are denoted as "other modules" 2021. In an embodiment, capture system 2001 includes rule database 2019 (or other storage device such as RAM) to store the rules used by capture system 2001. In other embodiments, the rules are stored off capture system 2001 but are still accessible to capture system 2001. The rule database may also include policies or the policies may be stored off capture system 2001. A user's system 2005 may access capture system 2001 to do one or more of the following: 1) view or retrieve a rule; 2) view or retrieve a tag; 3) view or retrieve an object; 4) etc. Also illustrated is an external storage location(s) 2003 to store tags and/or objects. Of course, as described earlier, this content storage 2003 may be local to capture system 2001.

An administration system 2023 includes the necessary modules for creating an OLAP, which is then used to create a rule and/or policy. Administration system 2023 may be a separate entity, as illustrated, or incorporated into either user system 2005, or capture system 2001. As shown, user system 2005 is a "dumb" terminal that has access to both capture 2001 and administration 2023 systems. For example, user system 2005 may connect through a software program such as a Web browser to receive information from capture system 2001 or administration system 2023.

There are several ways for mining modules 2007, 2009 to receive this information. Usually, a user supplies this information through a graphical user interface (GUI) provided by presentation module 2015. For example, in an embodiment the user uses a Web browser to provide the requirements. Alternatively, a user may supply a data mining request using a memory storage device such as a flash storage device, optical storage medium, etc. or via a network connection (such as an FTP connection).

As described earlier, the creation of an OLAP cube progresses through several stages. Typically, a user provides data mining module 2007 or other mining modules 2009 (text, image, etc.) with requirements for what should be retrieved from the tag and/or object database(s) (e.g., content storage 2003). If capture system 2001, and by extension content storage 2003, utilizes multiple hierarchies of storage by date (time), then the requirements may begin with a target date (or time) range to search and/or retrieve from content storage 2003. Retrieving from storage and copying the data to a local storage location (RAM, disk, etc.) normally provides a performance benefit over searching the storage 2003 directly because, unless capture system 2001 is not operational it will continue to access storage thereby slowing the seek timing of the disks of content storage 2003.

One or more filters 2011 are applied to the data retrieved from content storage 2003 to further narrow what has been mined. As discussed earlier, this "preprocessing" removes information that is not useful. Again, a user may supply this information via presentation module 2015 or other channels. It is preferred to work with tags and not objects for the creation of an OLAP for several reasons, but primarily because the process will be much quicker when working with tags instead of having to handle the processing an object to see what the object describes (this information presumably is already stored in the tags). Accordingly, filters are usually focused on the different components of a tag as described earlier. For example, a user may filter based on the communication parameters used, content type, concept, words, or fingerprint.

The filtered information is transformed by transform module 2025 into buckets. These buckets will help with the construction of an OLAP cube because they usually align with the axes of the cube. However, in some instances more filtering/re-arranging may be needed. Data-mining module 2007 and other mining modules 2009 (such as a text mining module) perform mining operations on the filtered and/or transformed data. The results of this mining are processed by the OLAP generator module to generate one or more OLAP cubes. Using these cubes, it is easier for patterns to emerge for a rule and/or policy creator to see and create a rule and/or policy accordingly.

Presentation module 2015 displays the OLAP cube to a user (either directly or through another conveyance such as a Web page or print out). Additionally, presentation module 2015 also has access to the other modules of administration system 2023. Accordingly, a user may input the filter parameters, see the mining results, etc. A rule and/or policy generator 2017 to generate a rule or policy is also incorporated into administration system 2023. A user may input the parameters of a rule and/or policy to be created by rule and/or policy generator 2017 via presentation module 2015 or other channels.

Note that in one example implementation of the present invention, capture system 200 (and 312) includes software to achieve the optimal data mining and security policy management operations, as outlined herein in this document. These capture systems may be included within a network appliance, or provided as a separate component. In other embodiments, this feature may be provided external to a network appliance and/or capture systems 200 and 312 or included in some other network device to achieve this intended functionality.

The preceding operational flows have been offered for purposes of example and discussion. Substantial flexibility is provided by the discussed system in that any suitable arrangements, chronologies, configurations, and timing mechanisms may be provided without departing from the teachings of the present invention. Some of these outlined steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably.

In one non-limiting example implementation of one embodiment of the present invention, an article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable medium suitable for storing electronic instructions. In one embodiment, a capture system is an appliance constructed using commonly available computing equipment and storage systems capable of supporting the software requirements.

Closing Comments

An article of manufacture (such as a machine-readable medium) may be used to store program code. An article of manufacture that stores program code may be embodied as, but is not limited to, a machine-readable storage medium such as one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)). In one embodiment, a capture system is an appliance constructed using commonly available computing equipment and storage systems capable of supporting the software requirements.

Figure 21:
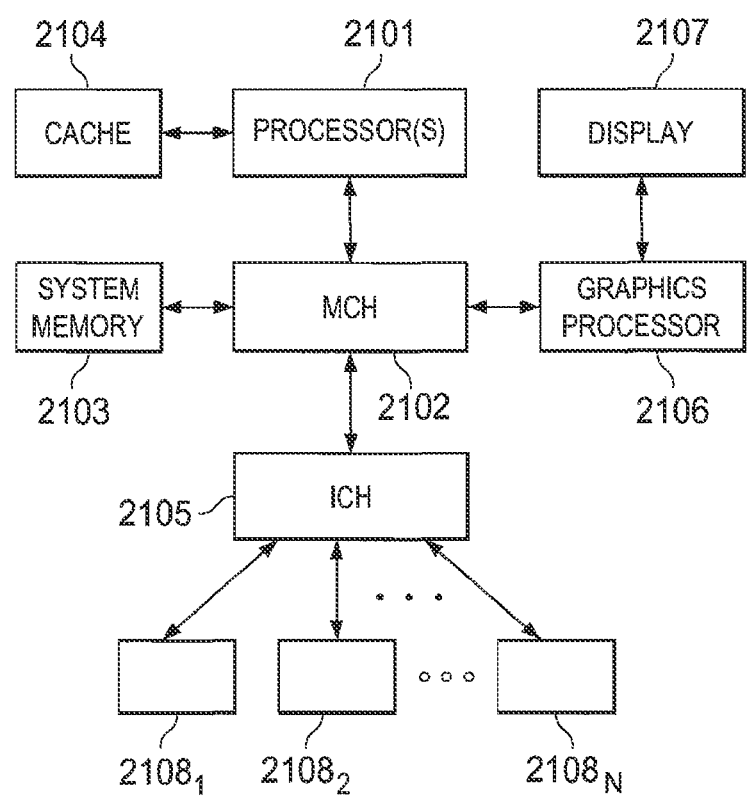
FIG. 21 shows an embodiment of a computing system.

FIG. 21 shows an embodiment of a computing system (e.g., a computer). The example computing system of FIG. 21 includes: 1) one or more processors 2101; 2) a memory control hub (MCH) 2102; 3) a system memory 2103 (of which different types exist such as DDR RAM, EDO RAM, etc,); 4) a cache 2104; 5) an I/O control hub (ICH) 2105; 6) a graphics processor 2106; 7) a display/screen 2107 (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices 2108.

One or more processors 2101 execute instructions in order to perform whatever software routines the computing system implements. The instructions frequently involve some sort of operation performed upon data. Both data and instructions are stored in system memory 2103 and cache 2104. Cache 2104 is typically designed to have shorter latency times than system memory 2103. For example, cache 2104 might be integrated onto the same silicon chip(s) as the processor(s) and/or constructed with faster SRAM cells, while system memory 2103 might be constructed with slower DRAM cells. By tending to store more frequently used instructions and data in the cache 2104 as opposed to system memory 2103, the overall performance efficiency of the computing system improves.

System memory 2103 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 2103 prior to their being operated upon by one or more processor(s) 2101 in the implementation of a software program. Similarly, data that a software program determines should be sent from the computing system to an outside entity through one of the computing system interfaces, or stored into an internal storage element, is often temporarily queued in system memory 2103 prior to its being transmitted or stored.

ICH 2105 is responsible for ensuring that such data is properly passed between system memory 2103 and its appropriate corresponding computing system interface (and internal storage device if the computing system is so designed). MCH 2102 is responsible for managing the various contending requests for system memory 2103 access amongst processor(s) 2101, interfaces, and internal storage elements that may proximately arise in time with respect to one another.

One or more I/O devices 2108 are also implemented in a typical computing system. I/O devices generally are responsible for transferring data to and/or from the computing system (e.g., a networking adapter), or for large-scale non-volatile storage within the computing system (e.g., hard disk drive). ICH 2105 has bi-directional point-to-point links between itself and observed I/O devices 2108. A capture program, classification program, a database a filestore, an analysis engine, and/or a graphical user interface may be stored in a storage device or devices 2108 or in memory 2103.

In the foregoing specification, the invention has been described with reference to specific example embodiments thereof. It will, however, be evident that various modifications and changes may be made thereto without departing from the broader spirit and scope of the invention as set forth in the appended Claims. The specification and drawings are, accordingly, to be regarded in an illustrative rather than a restrictive sense.

Thus, a capture system and a document/content registration system have been described. In the forgoing description, various specific values were given names, such as "objects" and "documents," and various specific modules, such as the "registration module" and "signature database" have been described. However, these names are merely to describe and illustrate various aspects of the present invention, and in no way limit the scope of the present invention. Furthermore, various modules may be implemented as software or hardware modules, combined, or without dividing their functionalities into modules at all. The present invention is not limited to any modular architecture either in software or in hardware, whether described above or not.

What is claimed is:

1. A method, comprising:
communicating a plurality of parameters from a client device, wherein the plurality of parameters are based, at least in part, on metadata information obtained from data mining one or more databases, at least one database including tags associated with objects, wherein the data mining includes applying one or more filters to the tags of the at least one database to obtain at least a portion of the metadata information, wherein the one or more filters are applied to one or more elements, respectively, of the tags;
creating a rule associated with at least some of the parameters; and
incorporating the rule into a security policy to be used by the client device and one or more additional client devices, wherein the security policy controls network communications involving the client device and the one or more additional client devices.

2. The method of claim 1, further comprising:
generating a capture rule for capturing items intended to be propagated as part of the network communications; and
generating a discovery rule for objects to be registered for future rule creations.

3. The method of claim 1, further comprising:
refining the security policy based on the rule, wherein the security policy identifies how one or more documents are permitted to traverse a network.

4. The method of claim 1, wherein the rule includes an action to be performed on one or more objects identified by the plurality of parameters.

5. The method of claim 1, wherein the plurality of parameters are based, in part, on textual information.

6. The method of claim 1, wherein the metadata information includes at least one Online Analytical Processing (OLAP) element.

7. The method of claim 1, wherein the one or more filters are associated with a group of characteristics, the group consisting of:

a) a communication parameter;
b) a content type;
c) a concept;
d) a fingerprint; and
e) a plurality of words.

8. The method of claim 1, further comprising:
updating, by the client device, one or more parameters for a new rule; and
storing the new rule in a database to be accessed by the additional client devices.

9. The method of claim 1, further comprising:
running the rule against one or more databases to determine if the rule provides a targeted result.

10. The method of claim 1, further comprising:
identifying at least one pattern from the metadata information, wherein the at least one pattern is used in formulating the rule.

11. A client device, comprising:
a processor; and
a memory, wherein the client device is configured for:
communicating a plurality of parameters from a client device, wherein the plurality of parameters are based, at least in part, on metadata information to be obtained from data mining one or more databases, at least one database including tags associated with objects, wherein the data mining includes applying one or more filters to the tags of the at least one database to obtain at least a portion of the metadata information, wherein the one or more filters are applied to one or more elements, respectively, of the tags;
creating a rule associated with at least some of the parameters; and
incorporating the rule into a security policy to be used by the client device and one or more additional client devices, wherein the security policy is to control network communications involving the client device and the one or more additional client devices.

12. The client device of claim 11, wherein the client device is further configured for:
generating a capture rule for capturing items intended to be propagated as part of the network communications; and
generating a discovery rule for objects to be registered for future rule creations.

13. The client device of claim 11, wherein the client device is further configured for:
refining the security policy based on the rule, wherein the security policy identifies how one or more documents are permitted to traverse a network.

14. The client device of claim 11, wherein the rule includes an action to be performed on one or more objects identified by the plurality of parameters.

15. The client device of claim 11, wherein the plurality of parameters are based, in part, on textual information.

16. One or more non-transitory tangible media that includes code for execution and when executed by a processor operable to perform operations comprising:
communicating a plurality of parameters from a client device, wherein the plurality of parameters are based, at least in part, on metadata information to be obtained from data mining one or more databases, at least one database including tags associated with objects, wherein the data mining includes applying one or more filters to the tags of the at least one database to obtain at least a portion of the metadata information, wherein the one or more filters are applied to one or more elements, respectively, of the tags;

creating a rule associated with at least some of the parameters; and incorporating the rule into a security policy to be used by the client device and one or more additional client devices, wherein the security policy is to control network communications involving the client device and the one or more additional client devices.

17. The media of claim 16, the operations further comprising:

generating a capture rule for capturing items intended to be propagated as part of the network communications; and generating a discovery rule for objects to be registered for future rule creations.

18. The media of claim 16, the operations further comprising:

refining the security policy based on the rule, wherein the security policy identifies how one or more documents are permitted to traverse a network.

19. The media of claim 16, wherein the rule includes an action to be performed on one or more objects identified by the plurality of parameters.

20. The media of claim 16, wherein the plurality of parameters are based, in part, on textual information.

\* \* \* \* \*